(12) United States Patent
Desmurs et al.

(10) Patent No.: US 10,109,883 B2
(45) Date of Patent: *Oct. 23, 2018

(54) POLYMERS CONTAINING SULFONAMIDE SODIUM OR LITHIUM SALTS, METHODS FOR PRODUCTION THEREOF AND USES OF SAME AS ELECTROLYTES FOR BATTERIES

(71) Applicants: CDP INNOVATION, Lyons (FR); CENTRE NATIONAL DE LA RECHERCHE SCIENTIFIQUE, Paris (FR); UNIVERSITE D'AIX MARSEILLE, Marseilles (FR)

(72) Inventors: Jean-Roger Desmurs, Cannes (FR); Elisabet Dunach Clinet, Villeuneuve Loubet (FR); Philippe Knauth, Marseilles (FR); Vincent Morizur, Lannilis (FR); Sandra Olivero, Nice (FR)

(73) Assignees: CPD INNOVATION, Lyons (FR); CENTRE NATIONAL DE LA RECHERCHE SCIENTIFIQUE, Paris (FR); UNIVERSITE D'AIX MARSEILLE, Marseilles (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/327,606

(22) PCT Filed: Jul. 20, 2015

(86) PCT No.: PCT/FR2015/000153
§ 371 (c)(1),
(2) Date: Jan. 19, 2017

(87) PCT Pub. No.: WO2016/012669
PCT Pub. Date: Jan. 28, 2016

(65) Prior Publication Data
US 2017/0170516 A1    Jun. 15, 2017

(30) Foreign Application Priority Data
Jul. 23, 2014  (FR) .................... 14 01709

(51) Int. Cl.
| | |
|---|---|
| *H01M 10/0565* | (2010.01) |
| *C08G 65/48* | (2006.01) |
| *C08L 71/00* | (2006.01) |
| *H01M 10/052* | (2010.01) |
| *H01M 10/054* | (2010.01) |
| *H01B 1/12* | (2006.01) |
| *B01J 39/19* | (2017.01) |
| *B01J 47/12* | (2017.01) |
| *C08G 75/23* | (2006.01) |
| *C08J 5/22* | (2006.01) |
| *C08G 65/40* | (2006.01) |

(52) U.S. Cl.
CPC ......... *H01M 10/0565* (2013.01); *B01J 39/19* (2017.01); *B01J 47/12* (2013.01); *C08G 65/4012* (2013.01); *C08G 65/4056* (2013.01); *C08G 65/4093* (2013.01); *C08G 65/48* (2013.01); *C08G 75/23* (2013.01); *C08J 5/2256* (2013.01); *C08L 71/00* (2013.01); *H01B 1/128* (2013.01); *H01M 10/052* (2013.01); *H01M 10/054* (2013.01); *C08G 2650/40* (2013.01); *C08J 5/22* (2013.01); *C08J 2371/10* (2013.01); *C08J 2381/06* (2013.01); *H01M 2300/0082* (2013.01)

(58) Field of Classification Search
CPC .......... H01M 10/0565; H01M 10/052; H01M 10/054; H01M 2300/0082; C08J 5/2256; C08J 2381/06; C08J 2371/10; C08G 75/23; C08G 65/48; B01J 47/12; B01J 39/19
See application file for complete search history.

(56) References Cited

U.S. PATENT DOCUMENTS

| | | | |
|---|---|---|---|
| 5,438,082 A | 8/1995 | Helmer-Metzmann et al. | |
| 6,090,895 A | 7/2000 | Mao et al. | |
| 2007/0128522 A1 | 6/2007 | Gambut-Garel et al. | |
| 2012/0308899 A1 | 12/2012 | Tsai et al. | |
| 2014/0272600 A1 | 9/2014 | Bouchet et al. | |
| 2017/0179526 A1* | 6/2017 | Desmurs | H01B 1/128 |

FOREIGN PATENT DOCUMENTS

| | | |
|---|---|---|
| EP | 0 574 791 A2 | 12/1993 |
| FR | 2 853 320 A1 | 10/2004 |
| FR | 2 979 630 A1 | 3/2013 |
| JP | 2002-324559 A | 11/2002 |
| WO | 99/61141 A1 | 12/1999 |

OTHER PUBLICATIONS

International Search Report and Written Opinion dated Nov. 11, 2015 issued in corresponding application No. PCT/FR2015/000153; w/ English partial translation and partial machine translation (18 pages).

Bouchet et al., "Single-ion BAB triblock copolymers as highly efficient electrolytes for lithium-metal batteries", Nature Materials, vol. 12, May 2013, pp. 452-457; cited in the Specification.

International Search Report and Written Opinion dated Nov. 11, 2015 in PCT/FR2015/000154 filed Jul. 20, 2015, now co-pending U.S. Appl. No. 15/327,609, filed Jan. 19, 2017; with English partial translation and partial machine translation (19 pages).

\* cited by examiner

*Primary Examiner* — Stewart A Fraser
(74) *Attorney, Agent, or Firm* — Westerman, Hattori, Daniels & Adrian, LLP

(57) ABSTRACT

The invention relates to novel polymers containing grafted sodium or lithium sulphonamides, production methods thereof and uses of same as electrolytes in batteries.

20 Claims, No Drawings

POLYMERS CONTAINING SULFONAMIDE SODIUM OR LITHIUM SALTS, METHODS FOR PRODUCTION THEREOF AND USES OF SAME AS ELECTROLYTES FOR BATTERIES

BACKGROUND ART

This invention relates to novel polymers containing grafted sulfonamide lithium or sodium salts, methods of preparation thereof and uses thereof as electrolytes in lithium or sodium batteries.

More specifically, this invention relates to novel polymer electrolytes obtained from commercially available polymers as well as novel lithium polymer or sodium polymer-type batteries.

Lead batteries have been the most commonly used for many decades. However, lead technology has numerous disadvantages associated with the weight of the batteries, the toxicity of the lead as well as the use of a corrosive liquid. This has led to the development of alkaline batteries, the electrodes of which are based on nickel and cadmium (nickel-cadmium batteries), or, more recently, based on nickel and metal hydrides (nickel-hydride batteries), or based on silver oxide coupled with zinc, cadmium or iron. All of these technologies use a potassium hydroxide solution as the electrolyte and have as a major disadvantage a relatively low mass energy density with regard to needs associated with the development of portable equipment such as telephones and computers. Moreover, the weight of these batteries is a disadvantage in terms of their use in electric vehicles.

Manufacturers have therefore developed a new line based on lithium batteries using a negative electrode based on carbon, into which the lithium is inserted, and a metal oxide, in particular cobalt, with a high oxidation potential as a positive electrode. The principle of operation is as follows:

During electrochemical charging of the battery, the lithium ions pass through the electrolyte, which is an ion conductor and electronic insulator and is intercalated in the negative electrode material generally formed by graphite during discharging of the battery; that is to say that, during use, it is the reverse phenomenon that occurs. The lithium ions are deintercalated.

In the batteries, the ion conductor or electrolyte, which separates the electrodes, is a key element. On the one hand, its state, liquid, solid or gelled, affects the safety of the system, and, on the other hand, its conductivity determines the operating temperature range.

In lithium batteries, liquid electrolytes based on an organic solvent, such as dimethylenecarbonate or ethylenecarbonate, and a dissolved salt, such as lithium hexafluorophosphate $LiPF_6$ or lithium bis (trifluoromethanesulfonyl) imidide $(CF_3SO_2)_2NLi$, are commonly used. However, they do not have the optimal safety conditions associated with the handling of a corrosive and flammable liquid. Moreover, these systems have the disadvantage of being capable of forming dendrites during battery charging, which may cause a short circuit and destruction of the battery.

To overcome these major disadvantages, a new technology has been developed, based on solid lithium anode polymer electrolytes, resulting in the name "lithium polymer battery". Thus, patent FR 2853320 describes electrolytes obtained by polymerization of polyorganosiloxanes by a photoinitiator in the presence of an electrolyte salt. Aside from the fact that the anion is not immobilized and migrates into the electrolyte causing polarization phenomena at the electrodes, this technique requires iodonium catalysts, which are particularly toxic. Thus Chung-Bo Tsai, Yan-Ru Chen, Wen-Hsien Ho, Kuo-Feng Chiu, Shih-Hsuan Su describe, in the patent US 2012/0308899 A1, the sulfonation of PEEK into SPEEK and the preparation of the corresponding lithium salt. This simple technique does not make it possible to have sufficient delocalization of the negative charge on the sulfonate function and the lithium ion is too coordinated with the sulfonate function to reach very high conductivities. More recently, another approach was described by some authors who attempted to immobilize the anion by polymerization of monomers containing the lithium salt serving as the electrolyte. The patent FR 2979630 and the publication of D. Gigmes et al. in Nature Materials, 12, 452-457 (2013) describe the synthesis of block copolymers containing an electrolyte, the anion of which is bound to the polymer. The conductivities indicated are the best obtained so far for lithium polymer batteries. In the synthesis of this type of electrolytes, the starting monomers are not commercial and must be prepared in several steps. Moreover, the polymerization technique for preparing block polymers is costly compared to other polymerization techniques.

SUMMARY OF THE INVENTION

To overcome these disadvantages, the applicant preferred to go in the direction of existing polymers, which is less costly.

This invention relates to novel polymers of formulas I, II, III, IV, V, VI, VII, VIII, IX, X, XI, XII, XIII, XIV and XV used as electrolytes for batteries or conductive polymers (I)

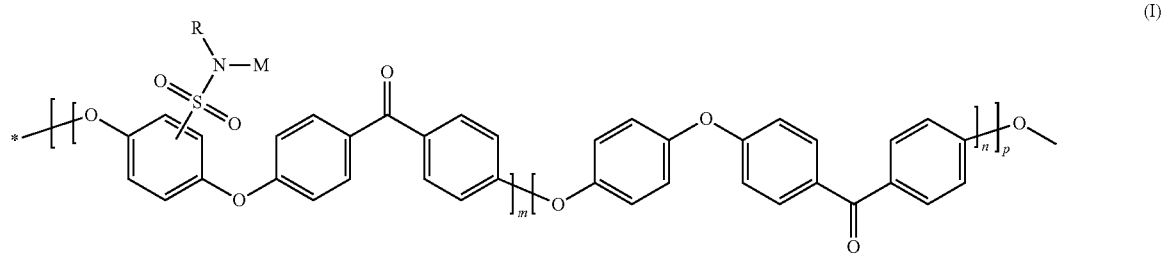

-continued
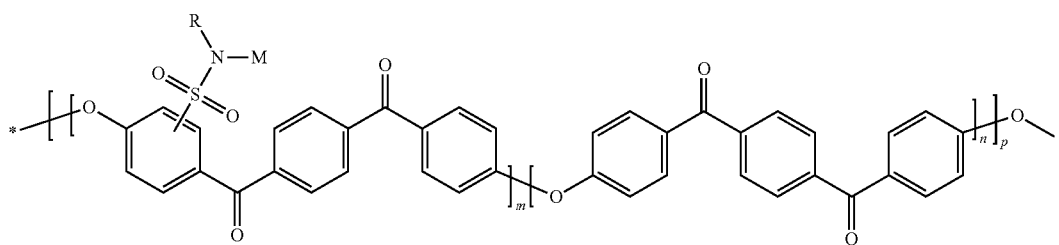
(II)
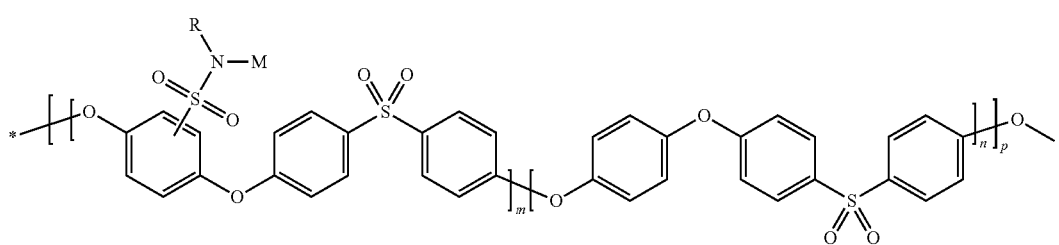
(III)
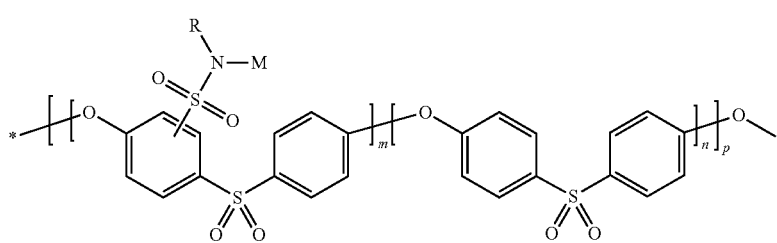
(IV)
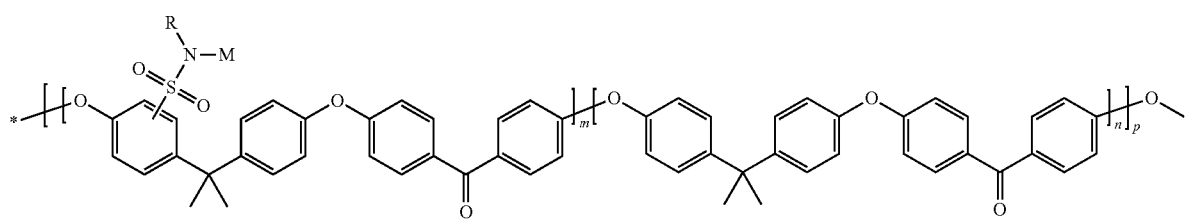
(V)
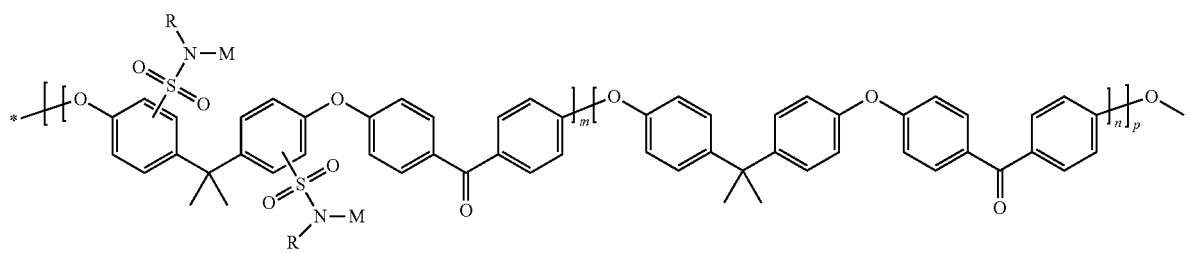
(VI)
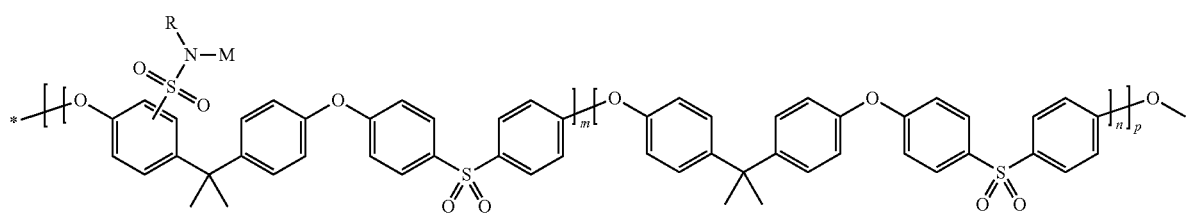
(VII)

(VIII)
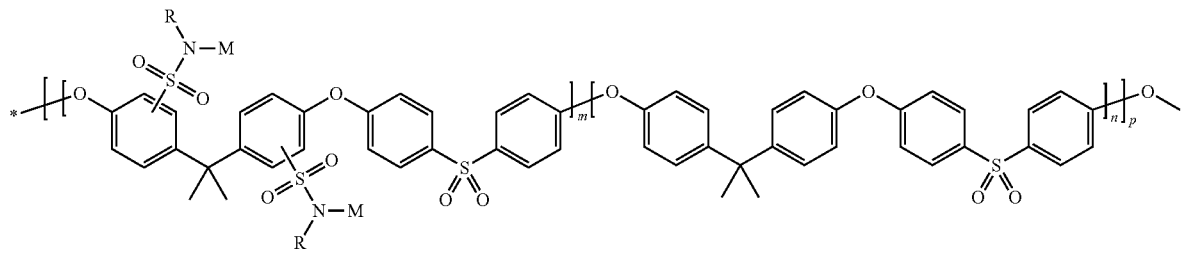
(IX)
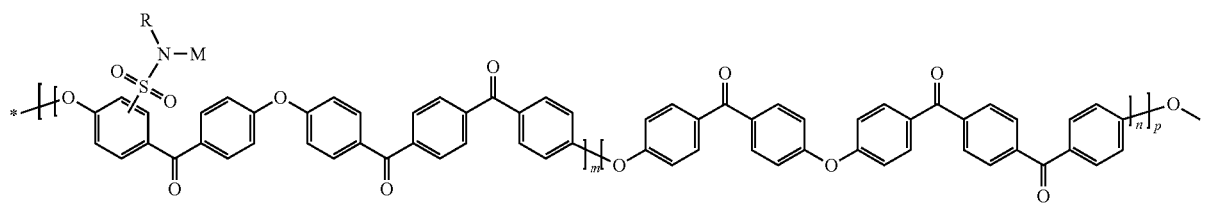
(X)
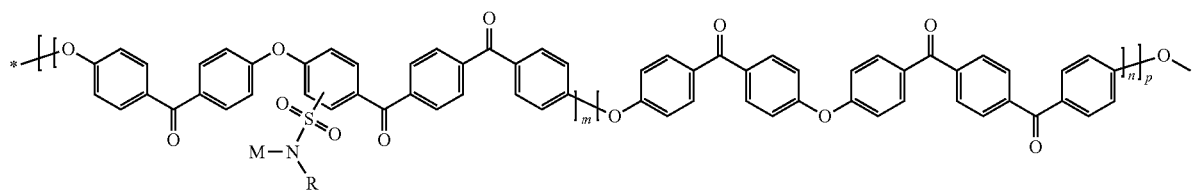
(XI)
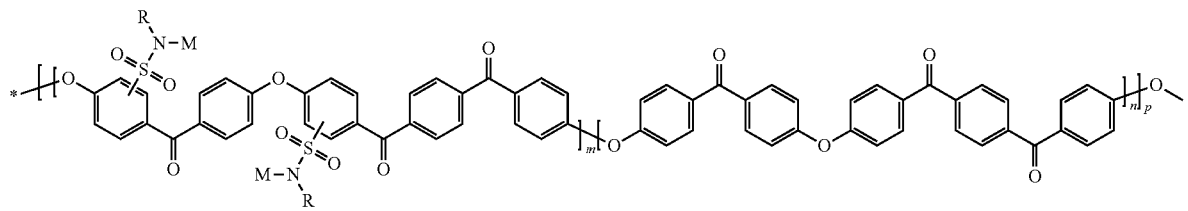
(XII)
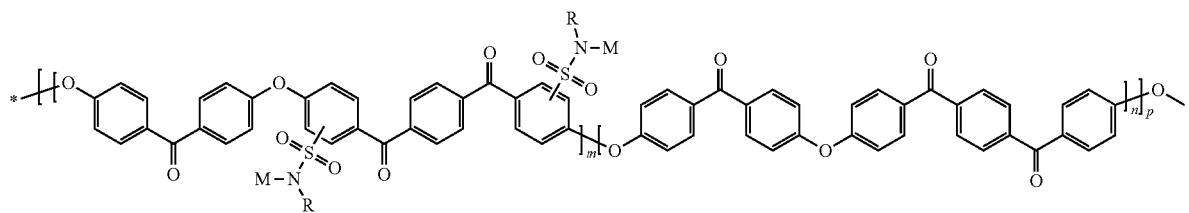
(XIII)
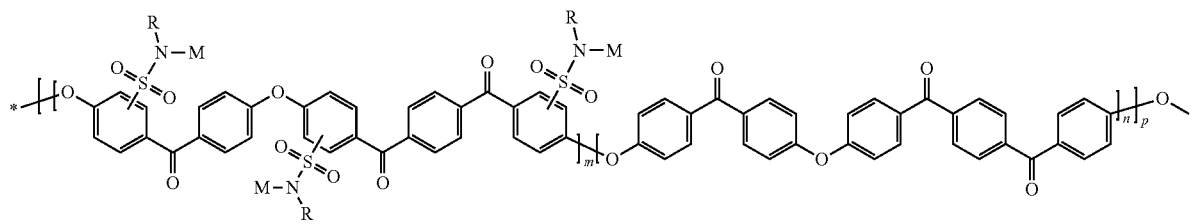

(XIV)

(XV)

wherein:
M represents a lithium or sodium atom
R represents
  an alkyl group having 1 to 30 linear or branched carbon atoms optionally substituted by a cycloalkyl, aryl motif;
  a cycloalkyl group, optionally substituted by aromatic groups;
  an aryl or polyaryl group optionally substituted by alkyl, cycloalkyl, polyfluoro- or perfluoroalkyl chains, nitrile functions, alkylsulfonyl functions, fluorine atoms;
m represents the percentage of polymer units having an oxoaryl or a dioxoaryl motif functionalized by a sulfonamide motif(s). This percentage varies between 50 and 100%, preferably between 90 and 100%,
n represents the percentage of polymer units having an oxoaryl or a dioxoaryl motif non-functionalized by one or more sulfonamide motif(s). This percentage varies between 0 and 50%,
p represents the number of polymer units of the polymer;
  p varies from 40 to 300, preferably between 60 and 200.
Preferably, in the novel polymers of formulas I, II, III, IV, V, VI, VII, VIII, IX, X, XI, XII, XIII, XIV and XV:
M represents a lithium atom,
R represents:
  an alkyl with 1 to 10 carbon atoms such as the methyl, ethyl, propyl, butyl, pentyl, hexyl, cyclohexyl, ethylhexyl groups;
  a 2,2-difluoroethyl, 2,2-difluro-2-(trifluoromethyl)ethyl group;
  an aryl group of the phenyl, tolyl, naphthyl, trifluoromethylphenyl, bis(trifluoromethyl)phenyl, cyanophenyl, alkylsulfonylphenyl, arylsulfonylphenyl type;
m represents the percentage of polymer units having an oxoaryl or a dioxoaryl motif functionalized by a sulfonamide motif. This percentage varies between 90 and 100%;
n represents the percentage of polymer units having no oxoaryl or dioxoaryl motif non-functionalized by a sulfonamide motif. This percentage varies between 0 and 10%;
p represents the number of polymer units of the polymer;
  P varies from 40 to 300.
More specifically, the polymers of formulas I, II, III, IV, V, VI, VII, VIII, IX, X, XI, XII, XIII, XIV and XV are preferred wherein:
M represents a lithium or sodium atom;
R represents:
  an alkyl group with 1 to 10 carbon atoms such as the methyl, ethyl, propyl, butyl, pentyl, hexyl, cyclohexyl, ethylhexyl groups;
  a 2,2-difluoroethyl, 2,2-difluro-2-(trifluoromethyl)ethyl group;
  an aryl group of the phenyl, tolyl, naphthyl, trifluoromethylphenyl, bis(trifluoromethyl)phenyl, cyanophenyl, alkylsulfonylphenyl, arylsulfonylphenyl, methoxyphenyl, butoxyphenyl, pentafluorophenyl, alkylsulfonylphenyl, fluorophenyl type,
m represents the percentage of polymer units having an oxoaryl or a dioxoaryl motif functionalized by a sulfonamide motif. This percentage varies between 90 and 100%;
n represents the percentage of polymer units having no oxoaryl or dioxoaryl motif non-functionalized by a sulfonamide motif. This percentage varies between 0 and 10%;
p represents the number of polymer units of the polymer;
  P varies from 60 to 200.
Very preferably, the polymers of formulas I, II, III, IV, V, VI, VII, VIII, IX, X, XI, XII, XIII, XIV and XV are chosen from the polymer wherein:
M represents a lithium or sodium atom,
R is a methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl) methyl, ((1R)-7,7-dimethyl-2-oxobicyclo[2.2.1]heptan-1-yl) methyl, (1S)-(7,7-dimethyl-2-oxobicyclo[2.2.1]heptan-1-yl) methyl, cyclohexylmethyl, phenyl, tolyl, naphthyl, 4-trifluoromethylphenyl, 3,5-bis(trifluoromethyl)phenyl, 4-cyanophenyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, 4-ethylphenyl, phenoxyethyl, methoxyethyl, ethoxyethyl, 4-methoxyphenoxyethyl group;

m represents the percentage of polymer units having a dioxoaryl motif functionalized by a sulfonamide. This percentage varies between 90 and 100%;

n represents the percentage of polymer units having a dioxoaryl motif non-functionalized by a sulfonamide. This percentage varies between 0 and 10%;

strength, too limited, binds the cations and, in particular, the lithium ions, too much. The sulfonamide motifs of the polymers according to the invention form acid functions of which the strength, greater than that of the sulfonic motifs, binds the cations and, in particular, the lithium ions, less significantly, thus facilitating their migration into the electrolyte.

According to a first variant, the polymers of formulas I, II, III, IV, V, VI, VII, VIII, IX, X, XI, XII, XIII, XIV and XV may be obtained:

1) by performing, in a first step, the chlorosulfonation of a polymer of formulas XVI, XVII, XVIII, XIX, XX, XXI, XXII and XXIII by a mixture of chlorosulfonic acid, thionyl chloride and a formamide according to an optimized process.

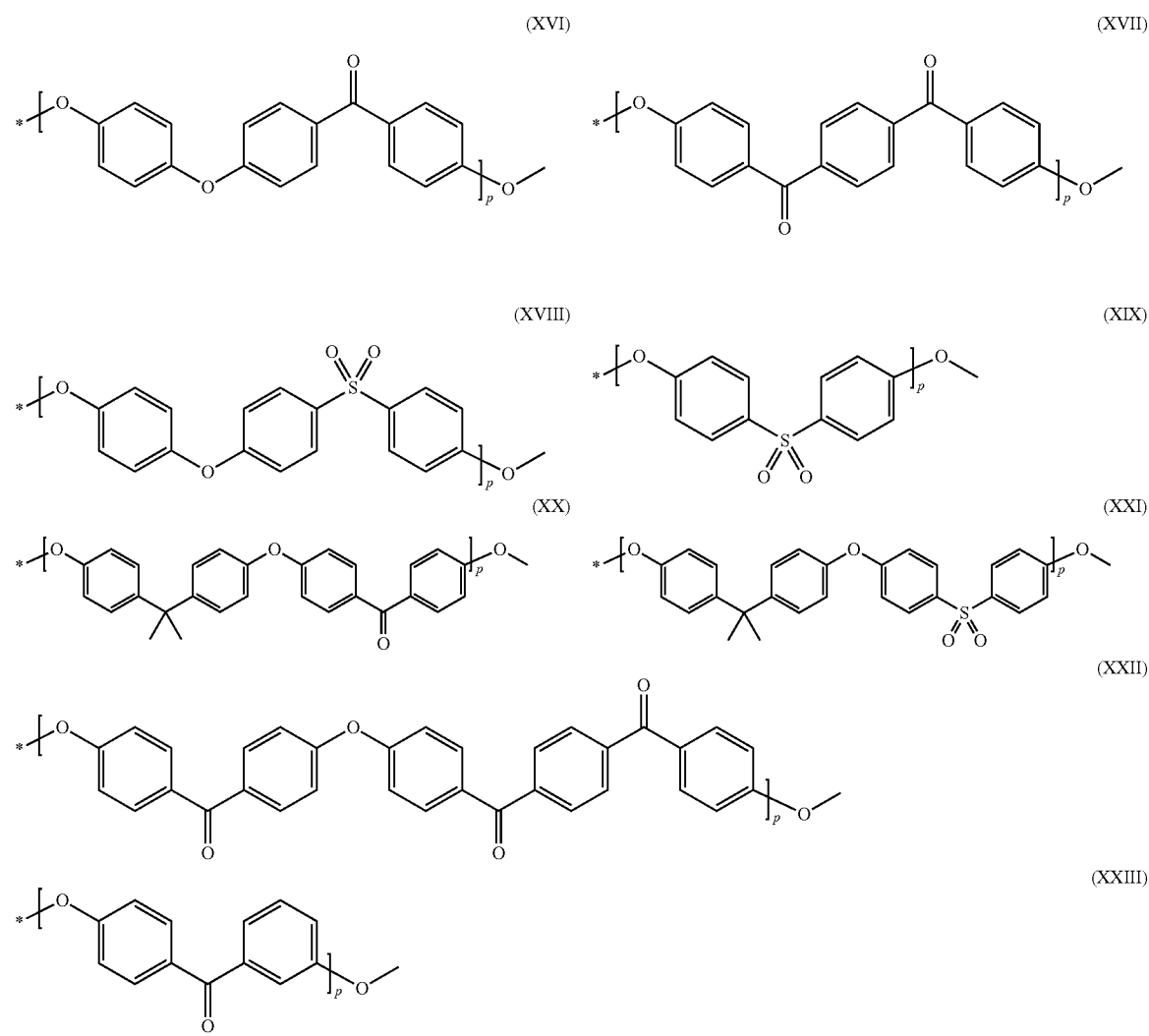

p represents the number of polymer units of the polymer;
P varies from 60 to 200.

The invention also relates to electrolytes formed by the aforementioned polymers, for batteries, as well as batteries comprising such electrolytes.

It should be noted that the aforementioned polymers according to the invention do not have sulfonic motifs —$SO_3H$. These motifs form acid functions of which the wherein:

p represents the number of polymer units of the polymer;

p varies from 40 to 300, preferably between 60 and 200.

To obtain the polymers of formulas XXIV, XXV, XXVI, XVII, XXVIII, XIX, XXX, XXXI, XXXII, XXVIII, XXXIV, XXXV, XXXVI, XXXVII and XXXVIII

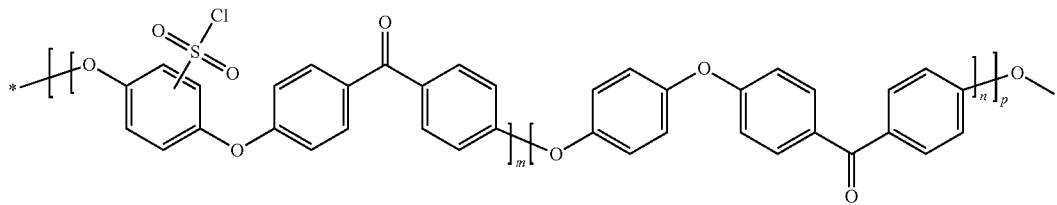
(XXIV)
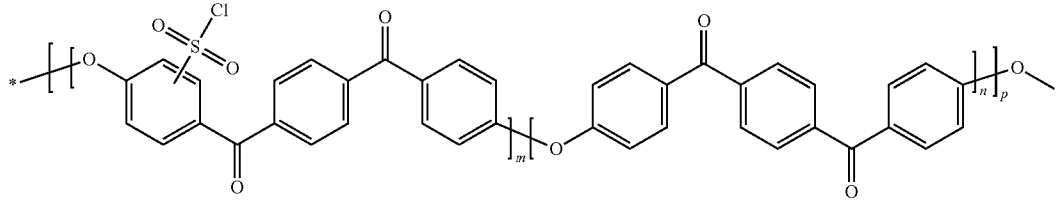
(XXV)
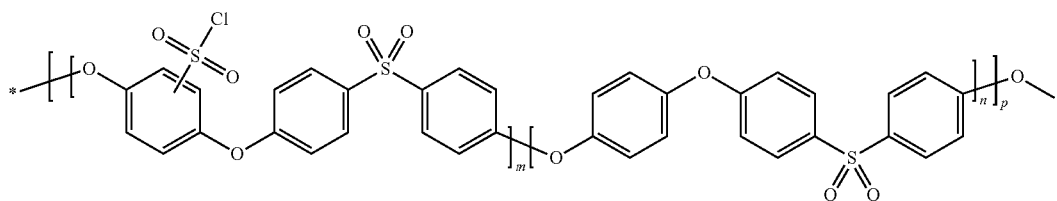
(XXVI)
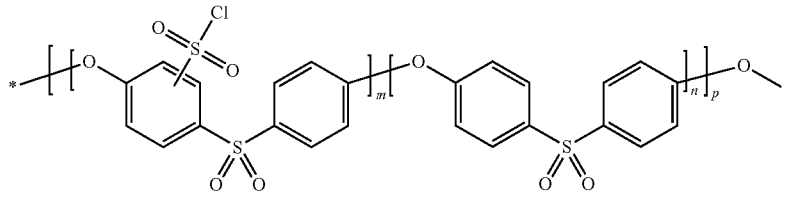
(XXVII)
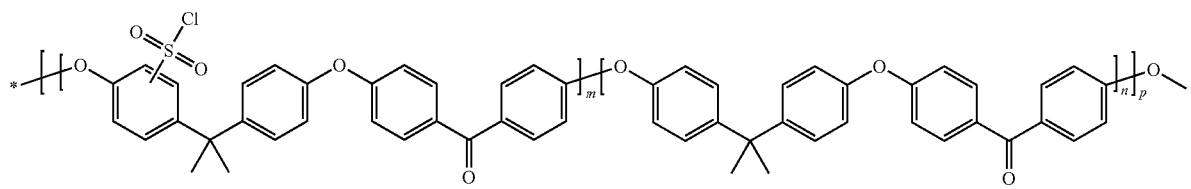
(XXVIII)
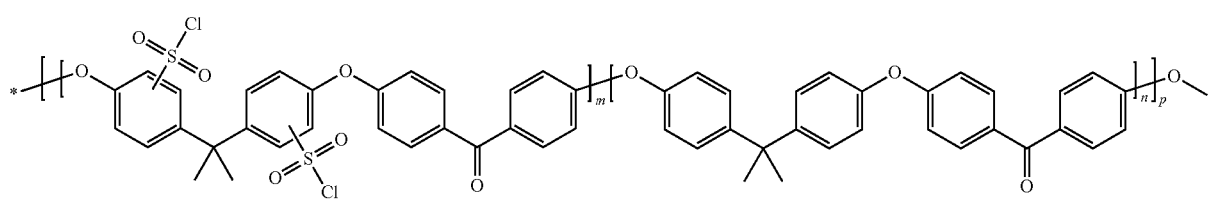
(XXIX)
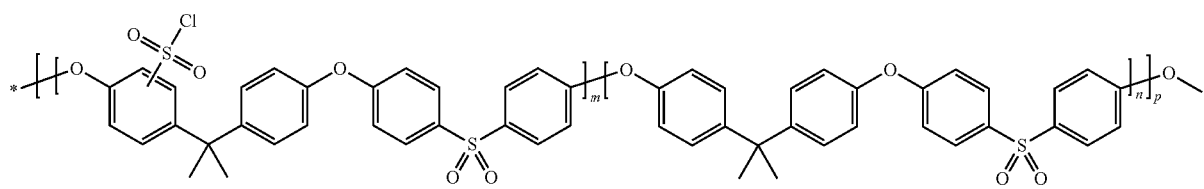
(XXX)

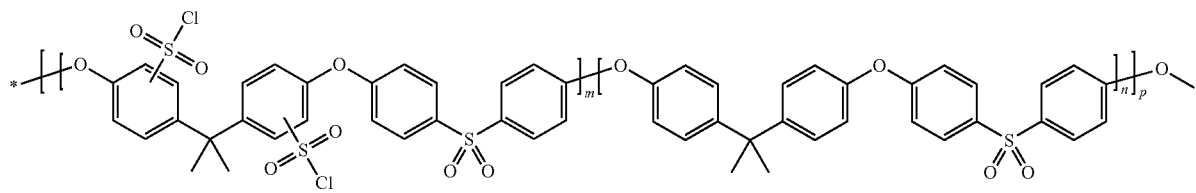
(XXXI)
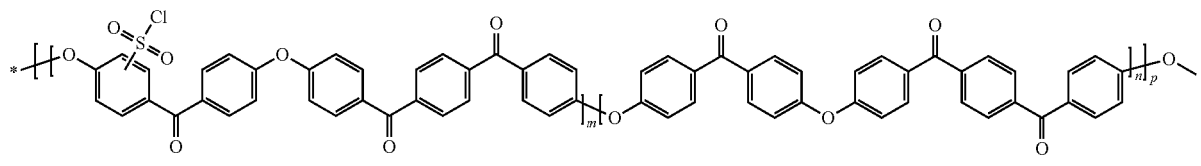
(XXXII)
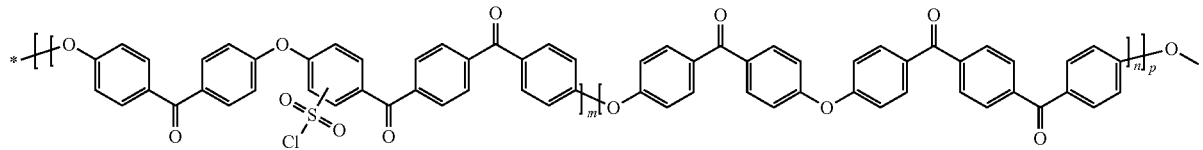
(XXXIII)
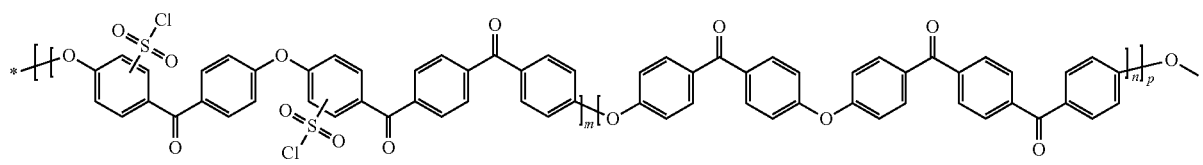
(XXXIV)
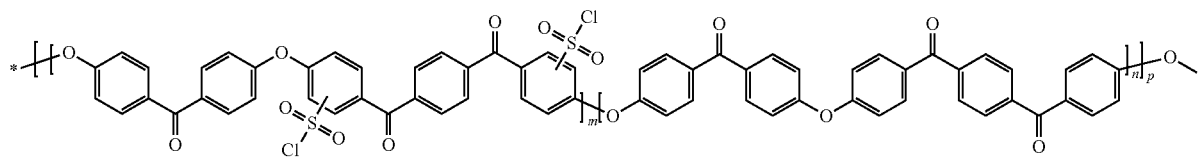
(XXXV)
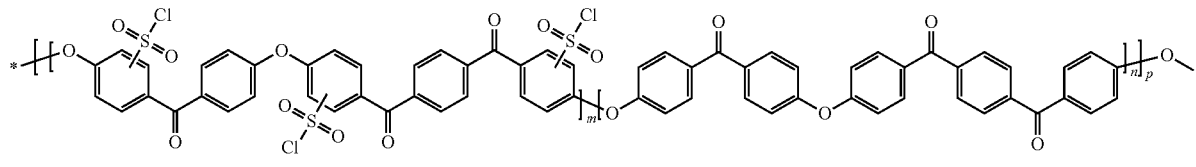
(XXXVI)
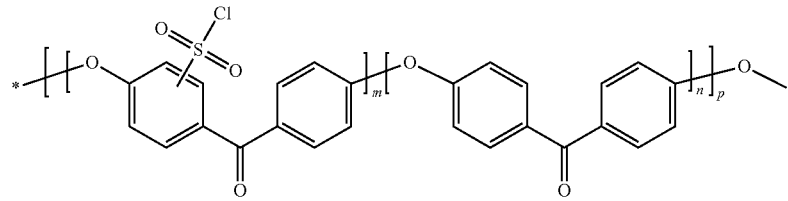
(XXXVII)
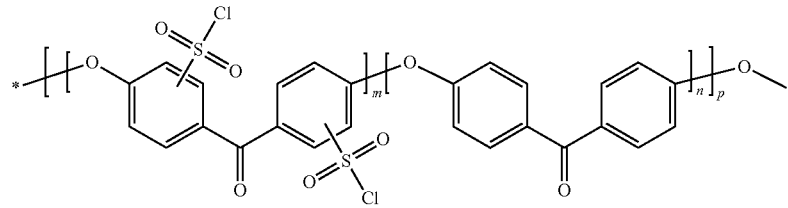
(XXXVIII)

wherein:
- m represents the percentage of polymer units having an oxoaryl or a dioxoaryl motif functionalized by a chlorosulfonated group. This percentage varies between 50 and 100%, preferably between 90 and 100%,
- n represents the percentage of polymer units having a dioxoaryl motif non-functionalized by a chlorosulfonated group. This percentage varies between 0 and 50%, preferably between 0 and 10%,
- p represents the number of polymer units of the polymer; P varies from 40 to 300, preferably between 60 and 200.

The starting polymers are commercial products. The polymer of formula XVI is commercially known as poly(ether ether ketone) or PEEK, (XVI)

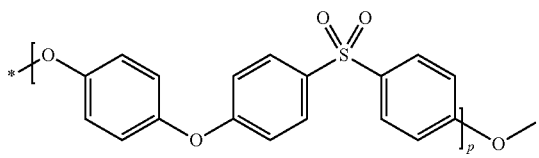

polymer XVII is commercially known as poly(ether ketone ketone) or PEKK (XVII)

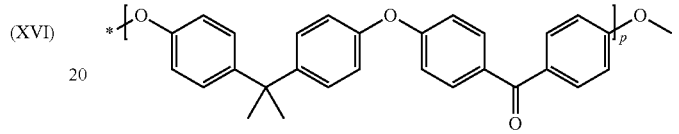

polymer XVIII is commercially known as poly(ether ether sulfone) or PEES (XVIII)

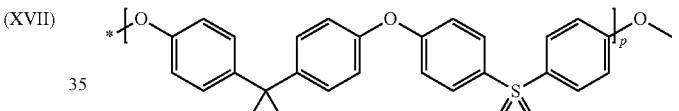

polymer XIX is commercially known as poly(ether sulfone) or PES (XIX)

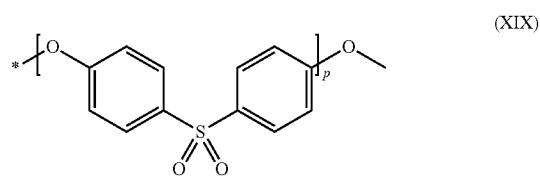

polymer XX belongs to the poly(arene ether ketone) family and is commercially known as poly(bisphenol A PAEK)

(XX)

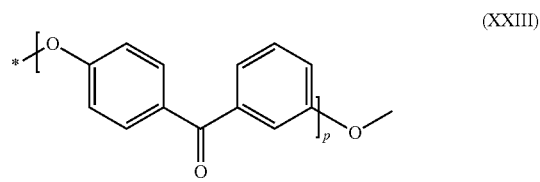

polymer XXI belongs to the poly(arene ether sulfone) family and is commercially known as poly(bisphenol A PAES)

(XXI)

polymer XXII is commercially known as poly(ether ketone ether ketone ketone) or PEKEKK (XXII)

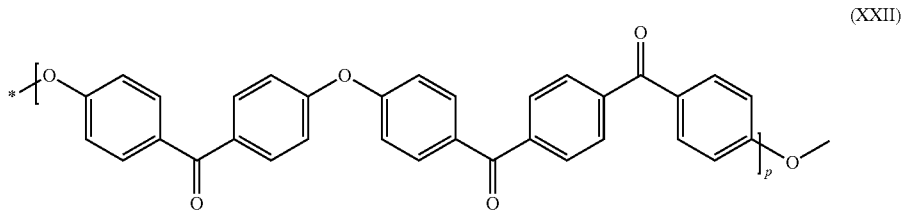

polymer XXIII is commercially known as poly(ether ketone) or PEK (XXIII)

This list of polymers is not exhaustive since there are many other polymers commercially available or not in the poly(aryl ether ketone), poly(aryl ether sulfone) families. According to the invention, the preferred polymers, owing to their high availability, are PEEK, PEK, PES, PEKK and PEKEKK.

The chlorosulfonation is performed at a temperature of between 0 and 80° C. with 1 to 10 equivalents of chlorosulfonic acid, 1 to 30 equivalents of thionyl chloride, 1 to 10 equivalents of an amide, preferably N,N-dimethylformamide, with or without solvent. The solvents preferred according to the invention are THF, methyl THF, dichloromethane, dichloroethane. The chlorosulfonation of certain polymers may lead to mixtures of numerous isomers. This is particularly true for polymers XXII or PEKEKK. The chlorosulfonated polymers XXXII, XXXIII, XXXIV, XXXV and XXXVI are given as examples. Other isomers may be formed during chlorosulfonation.

2) In a second step, a reaction is produced on the polymers of formulas XXIV, XXV, XXVI, XVII, XXVIII, XIX, XXX, XXXI, XXXII, XXXIII, XXXIV, XXXV, XXXVI, XXXVII and XXXVIII with an amine of formula XXXIX in a solvent medium in the presence or not of a lithium or sodium base:

R—NH$_2$ (XXXIX)

wherein:
R represents a group or different groups chosen from:
    an alkyl or cycloalkyl group having 1 to 30 linear or branched carbon atoms, optionally substituted by a cycloalkyl, aryl, perfluoroalkyl, polyfluoroalkyl, mono or polyethoxy motif;
    an aryl or polyaryl group optionally substituted by alkyl, cycloalkyl, polyfluoro- or perfluoroalkyl, motifs, by nitrile functions, by alkyl- or alkylsulfonyl functions, by fluorine atoms;
m represents the percentage of polymer units having an oxoaryl or a dioxoaryl motif having a grafted sulfonamide salt. This percentage varies between 50 and 100%, preferably between 90 and 100%.

As a non-limiting example of amines capable of being used in the invention, we will cite 4-aminoindane, 5-aminoindane, 2-isopropylsulfonylaniline, 2-propylsulfonylaniline, 1-amino-5,6,7,8-tetrahydronaphthalene, 6-aminoquinoxaline, 3-trifluoromethylaniline, 4-trifluoromethylaniline, 2,2,2-trifluoroethylamine, aniline, methylamine, ethylamine, propylamine, pentafluoroaniline, 4-fluoroaniline, methoxymethylamine, ethoxyethylamine, phenoxyethylamine, 4-methoxyphenoxyethylamine, methoxyethoxyethylamine, 2-fluorophenoxyethylamine.

The lithium or sodium bases are preferably chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidide, tert-butyllithium, methyllithium, phenyllithium, phenylsodium, benzyllithium, benzylsodium, lithium dimsylate, sodium dimsylate. The preferred bases are those that do not form water during the reaction.

The solvents used for the condensation reaction of the amine of formula XXXIX with the chlorosulfonated polymers of formula XXIV, XXV, XXVI, XVII, XXVIII, XIX, XXX, XXXI, XXXII, XXXIII, XXXIV, XXXV, XXXVI, XXXVII and XXXVIII are polar aprotic solvents. The preferred solvents are THF, methyl THF, dioxane, dichloromethane and dichloroethane, dimethylsulfoxide.

According to a second variant, the polymers of formula I, II, III, IV, V, VI, VII, VIII, IX, X, XI, XII, XIII, XIV and XV may be obtained:

1) by performing, in a first step, the chlorosulfonation of a polymer of formula XVI, XVII, XVII, XIX, XX, XXI, XXII and XXIII by a mixture of chlorosulfonic acid, thionyl chloride and a formamide according to an optimized process

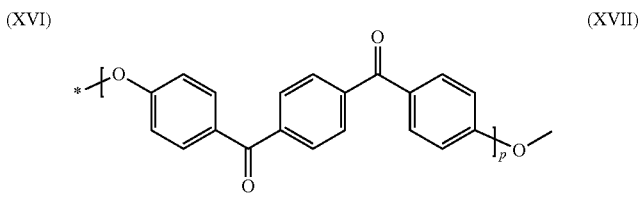

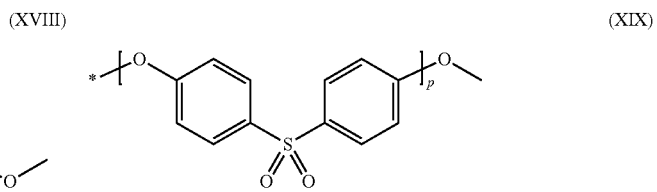

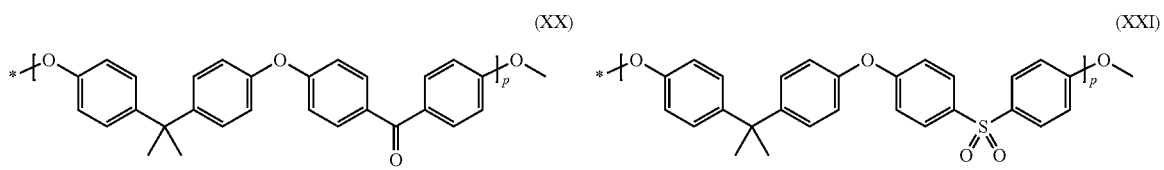

(XXII)
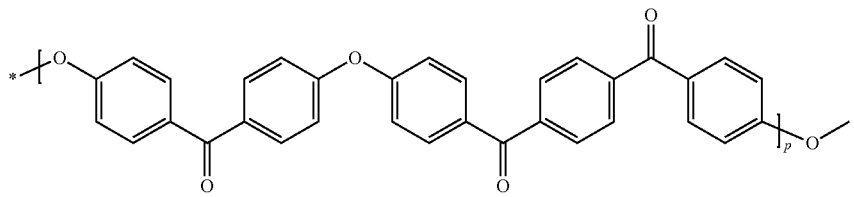
(XXIII)
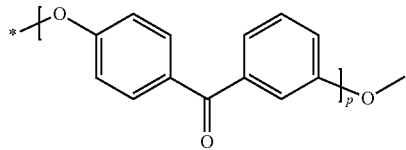
wherein:
p represents the number of polymer units of the polymer; p varies from 40 to 300, preferably between 60 and 200, to obtain the polymers of formulas XXIV, XXV, XXVI, XXVII, XXVIII, XXIX, XXX, XXXI, XXXII, XXXIII, XXXIV, XXXV, XXXVI, XXXVII and XXXVIII:
(XXIV)
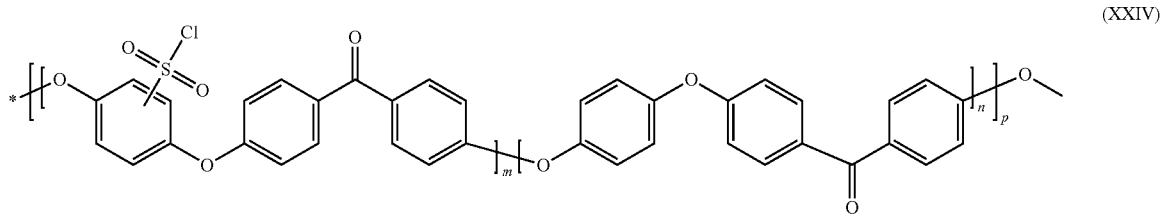
(XXV)
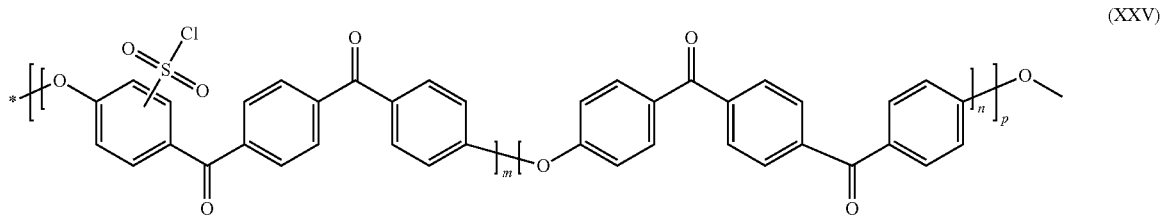
(XXVI)
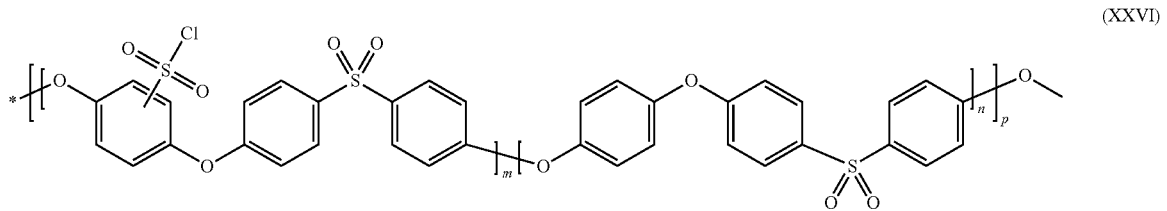
(XXVII)
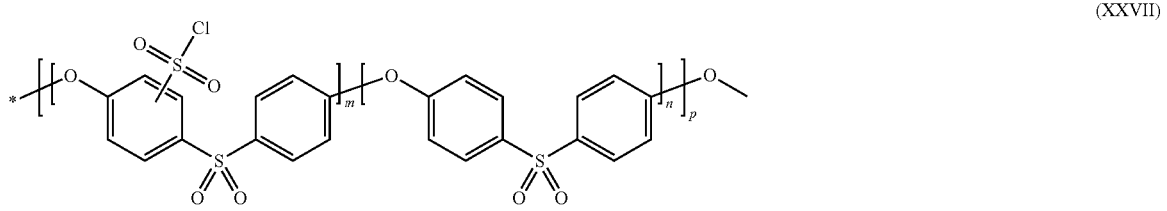
(XXVIII)
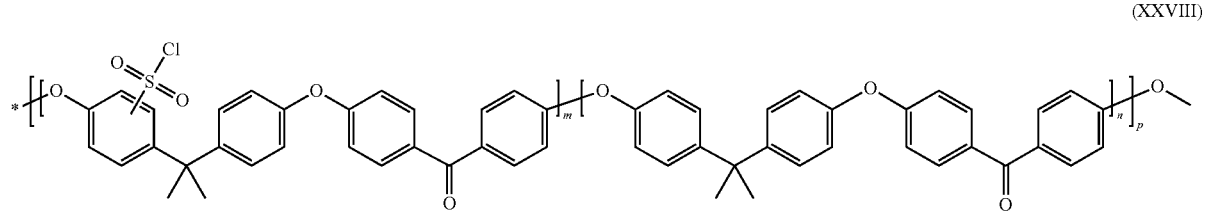

-continued
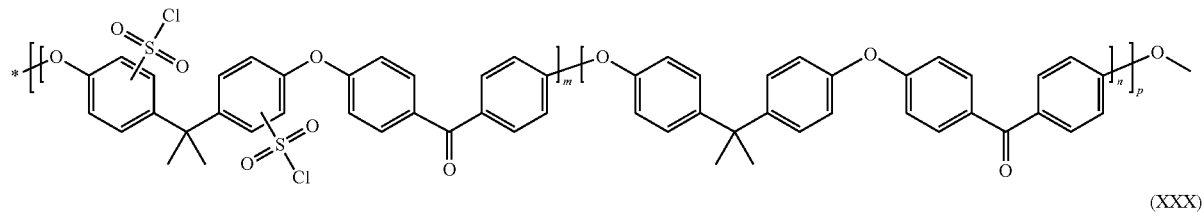
(XXIX)
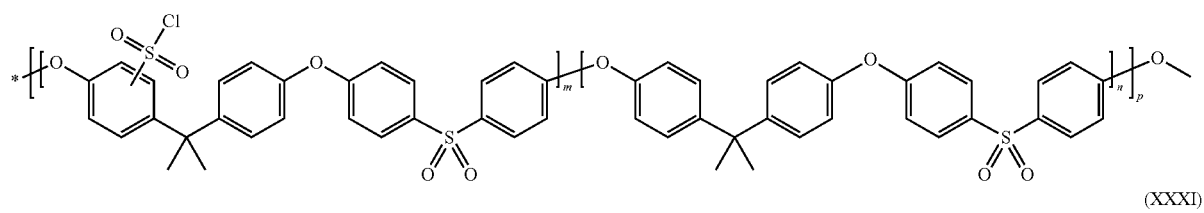
(XXX)
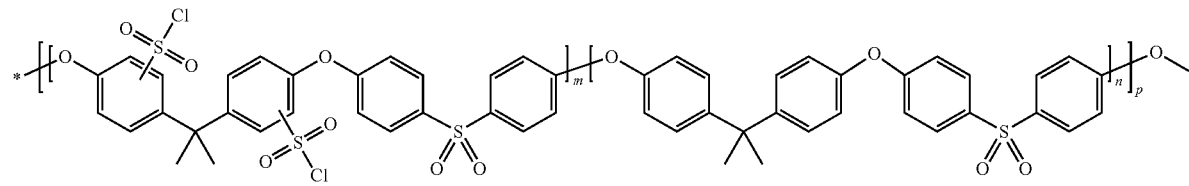
(XXXI)
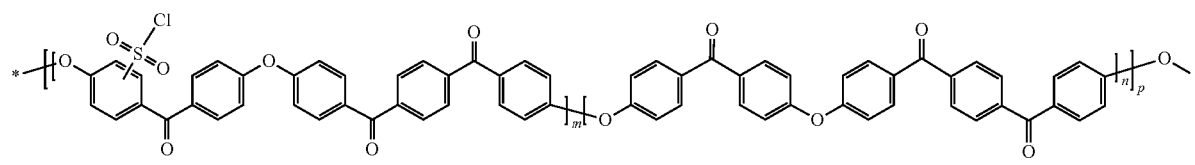
(XXXII)
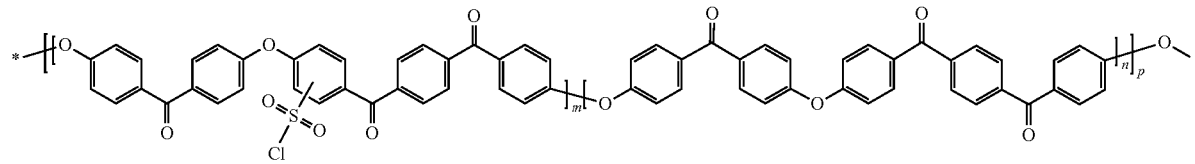
(XXXIII)
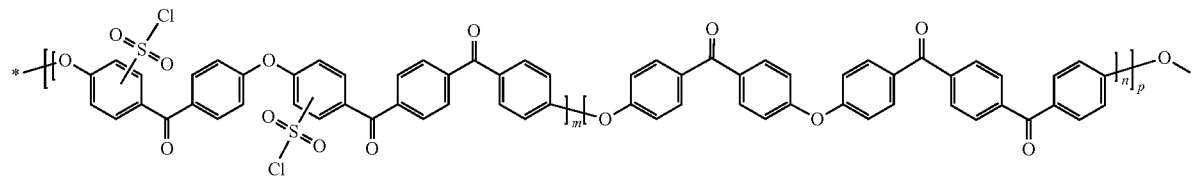
(XXXIV)
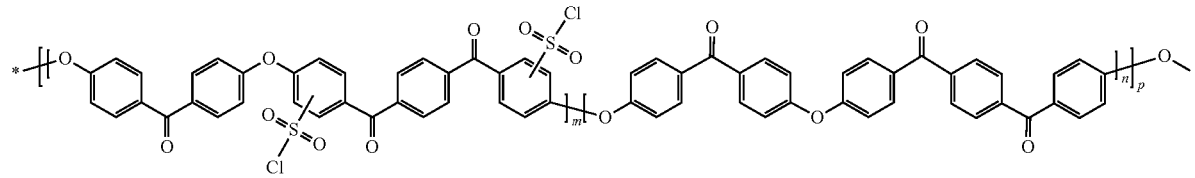
(XXXV)
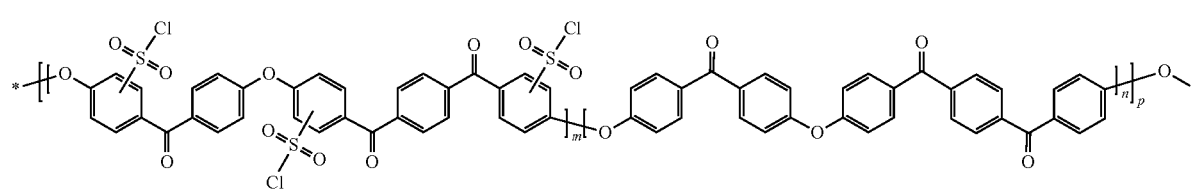
(XXXVI)

-continued

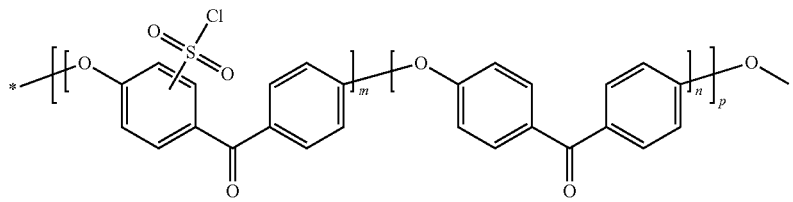
(XXXVII)

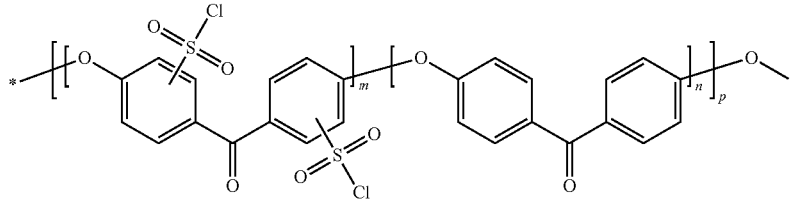
(XXXVIII)

wherein:
- m represents the percentage of polymer units having an oxoaryl or a dioxoaryl motif functionalized by a chlorosulfonated group. This percentage varies between 50 and 100%, preferably between 90 and 100%,
- n represents the percentage of polymer units having a dioxoaryl motif non-functionalized by a chlorosulfonated group. This percentage varies between 0 and 50%, preferably between 0 and 10%,
- p represents the number of polymer units of the polymer; P varies from 40 to 300, preferably between 60 and 200.

The starting polymers are commercial products. The polymer of formula XVI is commercially known as poly(ether ether ketone) or PEEK,

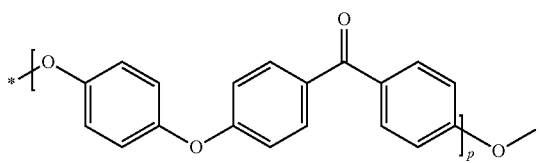
(XVI)

polymer XVII is commercially known as poly(ether ketone ketone) or PEKK

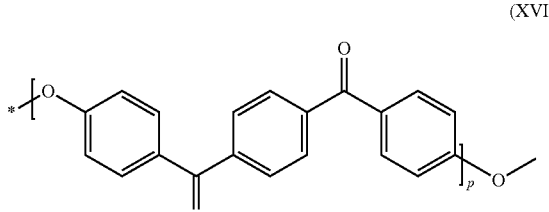
(XVII)

polymer XVIII is commercially known as poly(ether ether sulfone) or PEES

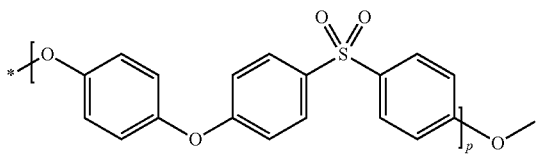
(XVIII)

polymer XIX is commercially known as poly(ether sulfone) or PES

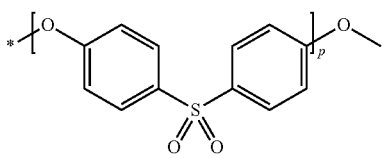
(XIX)

polymer XX belongs to the poly(arene ether ketone) family and is commercially known as poly(bisphenol A PAEK)

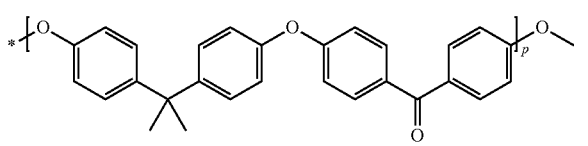
(XX)

polymer XXI belongs to the poly(arene ether sulfone) family and is commercially known as poly(bisphenol A PAES)

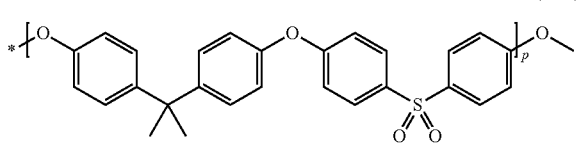
(XXI)

polymer XXII is commercially known as poly(ether ketone ether ketone ketone) or poly(ether ketone ether ketone ketone) or PEKEKK

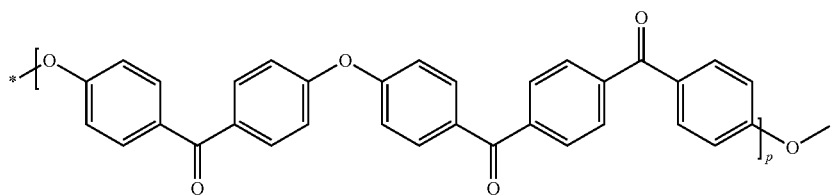

(XXII)

polymer XXIII is commercially known as poly(ether ketone) or poly(ether ketone) or PEK

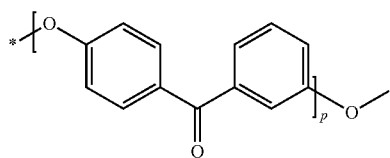

(XXIII)

This list of polymers is not exhaustive since there are many other polymers commercially available or not in the poly(aryl ether ketone), poly(aryl ether sulfone) families. According to the invention, the preferred polymers, owing to their high availability, are PEEK, PEK, PES, PEKK and PEKEKK.

The chlorosulfonation is performed at a temperature of between 0 and 80° C. with 1 to 10 equivalents of chlorosulfonic acid, 1 to 30 equivalents of thionyl chloride, 1 to 10 equivalents of an amide, preferably N,N-dimethylformamide, with or without solvent. The solvents preferred according to the invention are THF, methyl THF, dichloromethane, dichloroethane. The chlorosulfonation of certain polymers may lead to mixtures of numerous isomers. This is particularly true for polymers XXII or PEKEKK. The chlorosulfonated polymers XXXII, XXXIII, XXXIV, XXXV and XXXVI are given as examples. Other isomers may be formed during chlorosulfonation.

2) In a second step, a reaction is produced on the polymers of formulas XXIV, XXV, XXVI, XVII, XXVIII, XIX, XXX, XXXI, XXXII, XXXIII, XXXIV, XXXV, XXXVI, XXXVII and XXXVIII with the amine of formula

R—NH$_2$  (XXXIX)

in order to obtain the polymers of formula XL, XLI, XLII, XLIII, XLIV, XLV, XLVI, XLVII, XLVIII, XLIX, L, LI, LII, LIII and LIV,

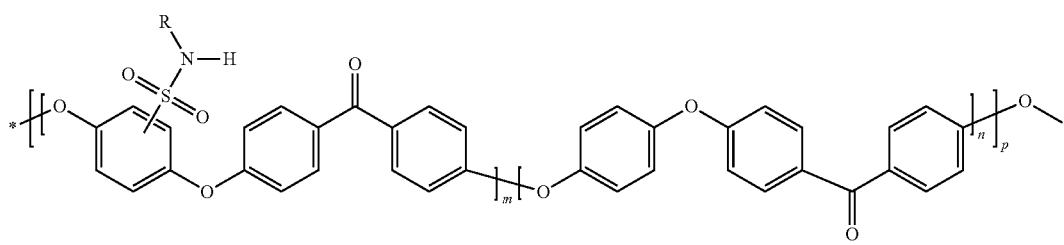

(XL)

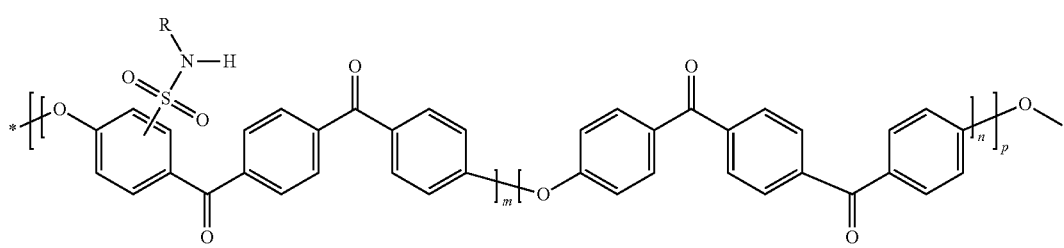

(XLI)

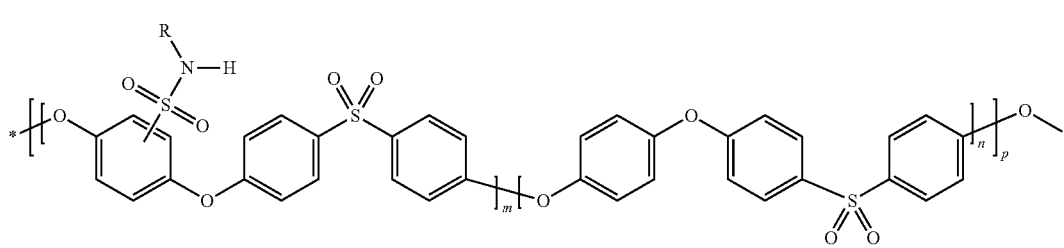

(XLII)

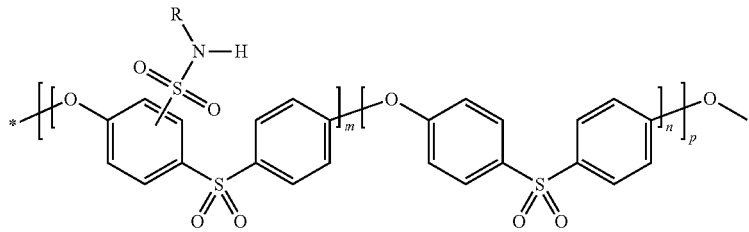
(XLIII)
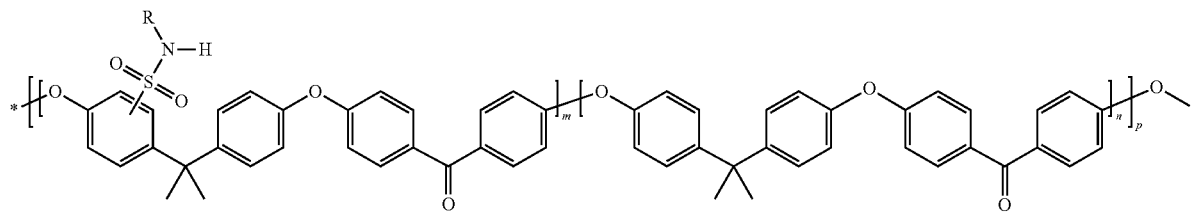
(XLIV)
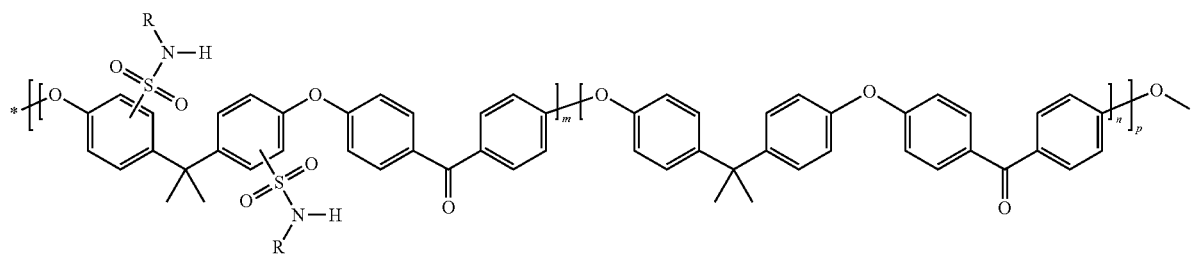
(XLV)
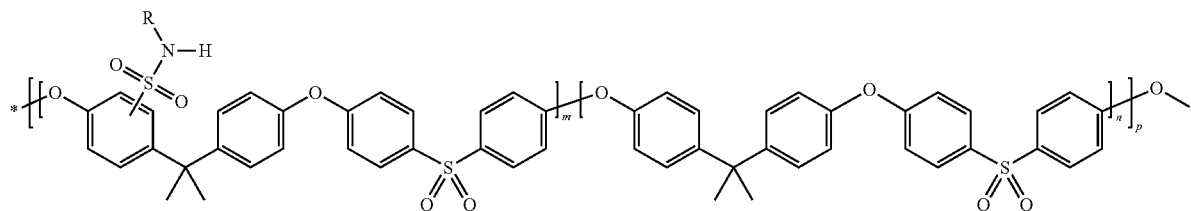
(XLVI)
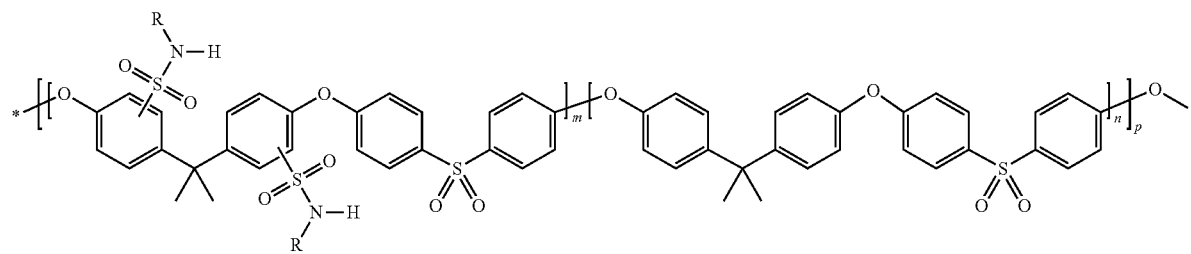
(XLVII)
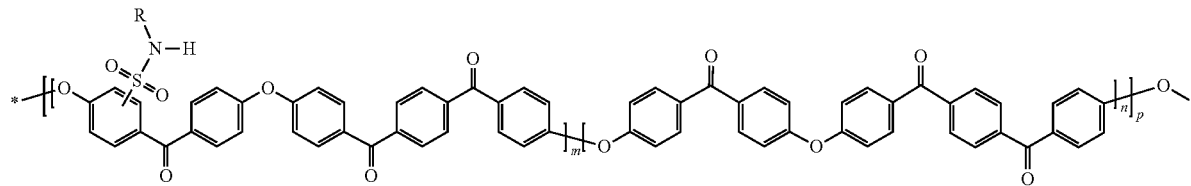
(XLVIII)

-continued
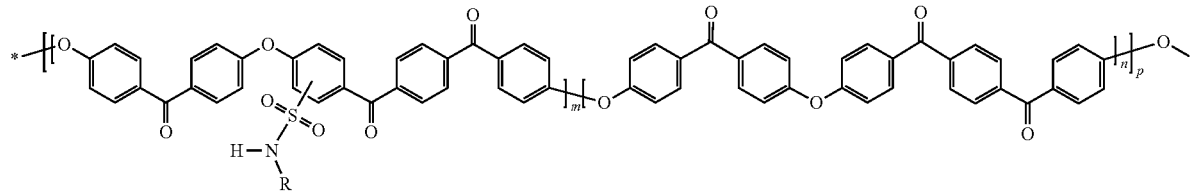
(XLIX)
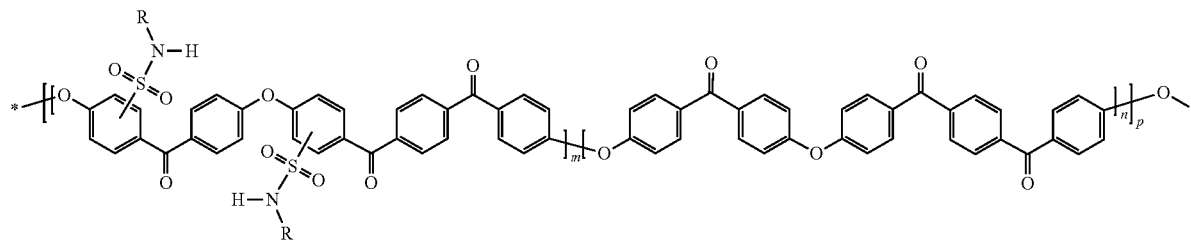
(IL)
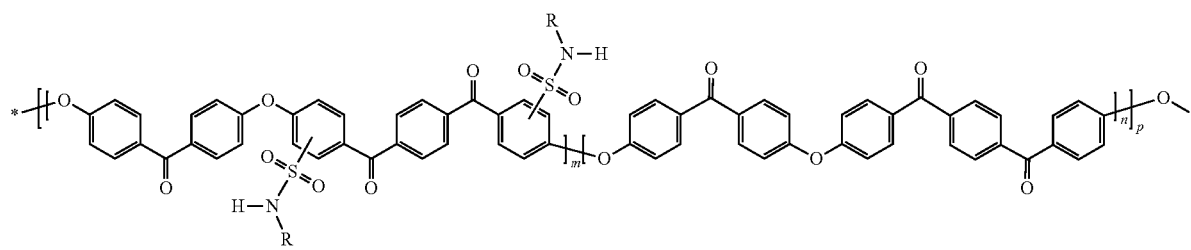
(LI)
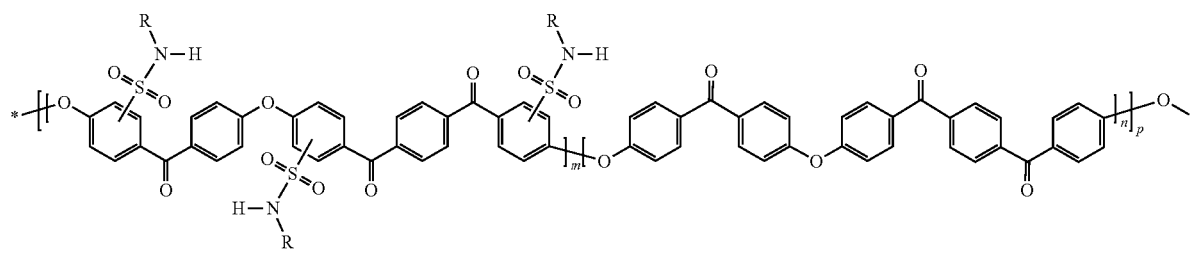
(LII)
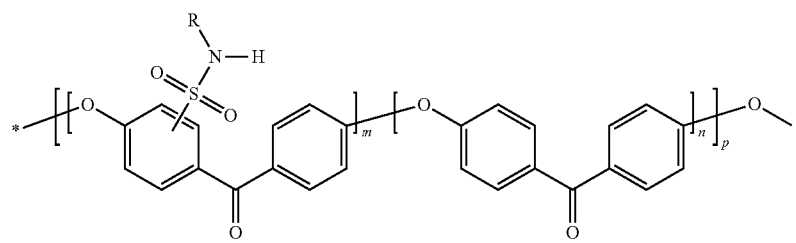
(LIII)
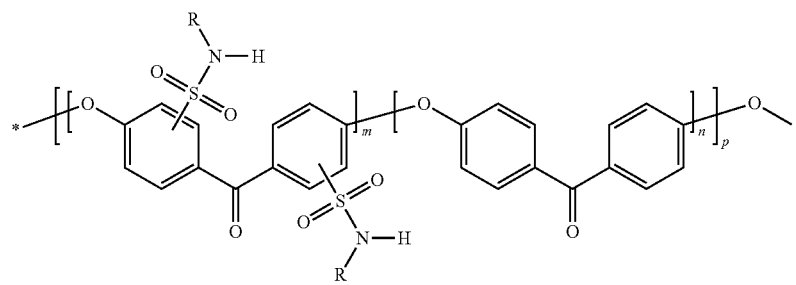
(LIV)

wherein:
m represents the percentage of polymer units having a functionalized oxoaryl or dioxoaryl motif having a sulfonamide function. This percentage varies between 50 and 100%,
n represents the percentage of polymer units having an oxoaryl or a dioxoaryl motif non-functionalized by a sulfonamide function. This percentage varies between 0 and 50%,
p represents the number of polymer units of the polymer; p varies from 40 to 300, preferably between 60 and 200.

To perform this reaction with the base of formula XXXIX, the polymers are solubilized in a solvent such as an ether, a halogenoalkane, an aromatic compound, or optionally in the amine of formula XXXIX if it is liquid under the reaction conditions. More generally, the amine of formula XXXIX is introduced in the form of a solution in an ether-type solvent, a halogenoalkane, an aromatic compound. The preferred solvents are dichloromethane, 1,2-dichloroethane, THF, methyl THF, diisopropyl ether, diethyl ether, anisole. With respect to the number of the chlorosulfonyl function of the polymer of formula XXIV, XXV, XXVI, XVII, XXVIII, XIX, XXX, XXXI, XXXII, XXVIII, XXXIV, XXXV, XXXVI, XXXVII and XXXVIII, 2 to 12 equivalents of an amine of formula XXXIX, preferably 2 to equivalents of amine are introduced. The tests are performed at a temperature of between −20° C. and 60° C., preferably between 0 and 30° C.

The polymers of formulas XL, XLI, XLII, XLIII, XLIV, XLV, XLVI, XLVII, XLVIII, XLIX, L, LI, LII, LIII and LIV are novel intermediates, for the preparation of polymers of formulas I, II, III, IV, V, VI, VII, VIII, IX, X, XI, XII, XIII, XIV and XV.

3) In a third step, a reaction is produced on the polymers of formula XL, XLI, XLII, XLIII, XLIV, XLV, XLVI, XLVII, XLVIII, XLIX, L, LI, LII, LIII and LIV with a lithium or sodium base at a temperature of between 0 and 80° C., preferably between 20 and 60° C. in a solvent medium.

Preferably, the R group of the amine XXXIX represents:
an alkyl group having 1 to 10 linear or branched carbon atoms optionally substituted by a cycloalkyl, aryl motif;
a cycloalkyl group;
an aryl or polyaryl group optionally substituted by alkyl, cycloalkyl, polyfluoro- or perfluoroalkyl chains, nitrile functions, alkylsulfonyl functions, one or more fluorine atoms.

The lithium or sodium bases are chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidure, tert-butyllithium, methyllithium, phenyllithium, phenylsodium, benzyllithium, benzylsodium, lithium dimsylate, sodium dimsylate. The preferred bases are those that do not form water during the reaction.

The preferred solvents are dichloromethane, 1,2-dichloroethane, THF, methyl THF, diisopropyl ether, DMSO, methanol, dioxane, isopropanol.

All of the reactions are performed with anhydrous solvents, preferably freshly distilled, and in an anhydrous atmosphere. By anhydrous atmosphere, we mean any atmosphere under a nitrogen or argon current.

The method developed by the applicant uses inexpensive products and results in electrolytes compatible with the expectations of the market and having performances equal or superior to those of the best products.

Surprisingly and unexpectedly, it was noted that the polymers of formula I, II, III, IV, V, VI, VII, VIII, IX, X, XI, XII, XIII, XIV and XV were particularly filmogenic, which is a clear advantage for the intended use. Thus, films of the polymers of formula I, II, III, IV, V, VI, VII, VIII, IX, X, XI, XII, XIII, XIV and XV may easily be obtained by evaporation of a polymer solution in an anhydrous solvent such as DMSO, deposited on a surface of a material such as glass, Teflon, or plastic. The evaporation of the solvent is performed at a temperature of between 20 and 80° C., by heating, by inert gas sweeping and/or by applying reduced pressure. It is thus possible to obtain films having a thickness of between 10 µm and 200 µm, which have good mechanical resistance. In practice, these films may be handled by an operator without being torn. It should be noted that polymers I, II, III, IV, V, VI, VII, VIII, IX, X, XI, XII, XIII, XIV and XV are not cross-linked in the films obtained. These polymers according to the invention are in fact rigid enough to obtain mechanically resistant films without cross-linking. The films obtained have a conductivity of 10-6 S/cm in a solvent medium and without solvent. The performances obtained are comparable to those of the best electrolytes. In addition, they have excellent conductivity over a wide temperature range from 20 to 100° C. It should be noted that the polymers according to the invention do not have polyoxyethyleneglycol motifs. However, it is known that these motifs are a favorable factor for the conductivity of the lithium ions, and it was not obvious that, with polymers not containing polyoxyethyleneglycols, or, necessarily, fluorine, such high conductivities could be obtained.

DETAILED DESCRIPTION OF PARTICULAR EMBODIMENTS

The examples presented below are provided as a non-limiting illustration of the subject matter of the present invention.

EXAMPLE 1

Chlorosulfonation of PEEK. Preparation of Polymer XXIV

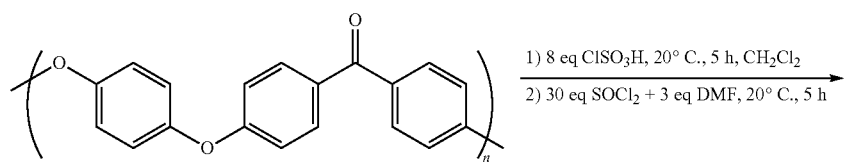

XVI

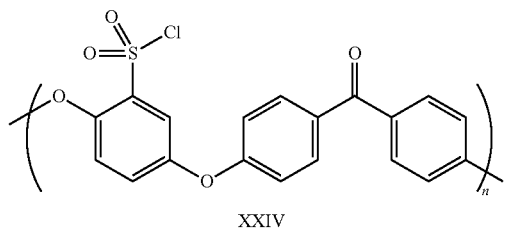

XXIV

In a nitrogen atmosphere, in a cylindrical glass reactor, 1.0 g of PEEK (XVI) is directly weighed, then 160 mL of distilled dichloromethane are added so as to have a PEEK (XVI) molar concentration of 0.022 M. All of the solvents used during these syntheses were distilled, stored and collected in a nitrogen atmosphere.

The chlorosulfonic acid (3.24 g, 8 equivalents with respect to the number of polymer units of the PEEK (XVI)) is introduced by means of a syringe (1.85 mL), taking care to work under a nitrogen flow. The reaction mixture is agitated at 20° C. for 5 h. At the end of the reaction, the formation of an orange viscous compound is observed. The supernatant is removed while taking care to work under a nitrogen flow.

Then, thionyl chloride (12.29 g, 30 equivalents with respect to the number of polymer units of the PEEK (XVI)) is introduced by means of a syringe (7.50 mL), taking care to work under a nitrogen flow. Then, N,N-dimethylformamide (0.76 g, 3 equivalents with respect to the number of polymer units of the PEEK (XVI)) is added by means of a syringe (0.81 mL) taking care to work under a nitrogen flow. The reaction mixture is again agitated at 20° C. for 5 h, then 40 mL of distilled THF are added. At the end of the reaction, an orange solution is observed.

The orange solution is precipitated in propan-2-ol (250 mL), and a white precipitate forms. The solid is filtered, then washed with 2 times 50 mL of propan-2-ol and 2 times 50 mL of acetonitrile, then dried for one night under vacuum ($1 \cdot 10^{-2}$ mbar).

The $^1$H NMR spectrum produced in DMSO-D6 ($^1$H NMR (200 MHz) δ 7.92-7.69 (m, 4H), 7.50 (d, J=2.7 Hz, 1H), 7.36-6.83 (m, 6H)) confirms the expected structure. The integration of the peak at 7.50 ppm in $^1$H NMR allows us to know the chlorosulfonation rate of the PEEK (XVI). The chlorosulfonation rate of the dioxoaryl motifs is 100%.

The PEEKSO$_2$Cl (XXIV) polymer weight yield is 98% with respect to the PEEK (XVI) used.

EXAMPLE 2-6

Preparation of Polymer XXIV with Different Functionalization Rate

According to the protocol described in example 1, the following polymers were prepared:

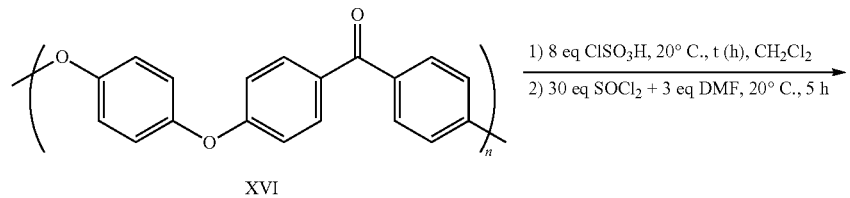

XVI

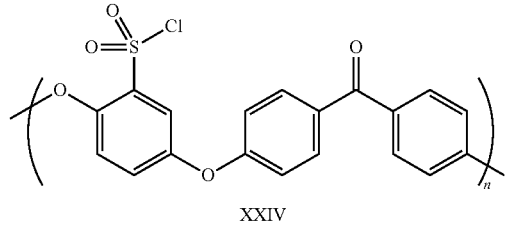

XXIV

The differences with respect to the protocol described in example 1 are:
the starting PEEK (XVI) product mass
the reaction time of the first step

| Examples | $m_{PEEK}$ (g) | t (h) | Functionalization rate(%) | Mass yield (%) |
|---|---|---|---|---|
| 2 | 1 | 3 | 72 | 91 |
| 3 | 2 | 4 | 81 | 93 |
| 4 | 2 | 5 | 93 | 97 |
| 5 | 5 | 15 | 96 | 96 |
| 6 | 10 | 15 | 99 | 96 |

EXAMPLE 7

Chlorosulfonation of PEES (XVIII). Preparation of Polymer XXVI

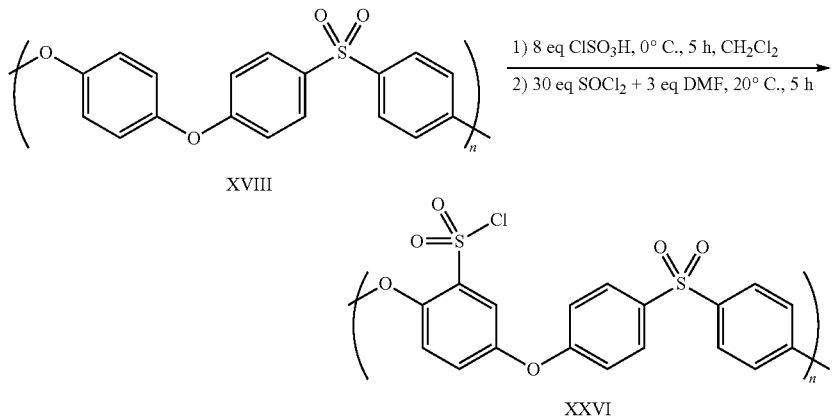

In a nitrogen atmosphere, in a cylindrical glass reactor, 1.0 g of PEES (XVIII) is directly weighed, then 160 mL of distilled dichloromethane are added so as to have a PEES (XVIII) molar concentration of 0.019 M. All of the solvents used during these syntheses were distilled, stored and collected in a nitrogen atmosphere.

The chlorosulfonic acid (2.88 g, 8 equivalents with respect to the number of polymer units of the PEES (XVIII)) is introduced by means of a syringe (1.64 mL), taking care to work under a nitrogen flow. The reaction mixture is agitated at 0° C. for 5 h. At the end of the reaction, the formation of a brown viscous compound is observed. The supernatant is removed while taking care to work under a nitrogen flow.

Then, thionyl chloride (10.93 g, 30 equivalents with respect to the number of polymer units of the PEES (XVIII)) is introduced by means of a syringe (6.6 mL), taking care to work under a nitrogen flow. Then, N,N-dimethylformamide (0.76 g, 3 equivalents with respect to the number of polymer units of the PEES (XVIII)) is added by means of a syringe (0.68 mL) taking care to work under a nitrogen flow. The reaction mixture is again agitated at 20° C. for 5 h, then 40 mL of distilled THF are added. At the end of the reaction, a brown solution is observed.

The brown solution is precipitated in propan-2-ol (250 mL), and a white precipitate forms. The solid is filtered, then washed with 2 times 50 mL of propan-2-ol and 2 times 50 mL of acetonitrile, then dried for one night under vacuum ($1 \cdot 10^{-2}$ mbar).

The $^1$H NMR spectrum produced in DMSO-D6 ($^1$H NMR (200 MHz) δ 7.91 (ddd, J=18.6, 8.8, 2.9 Hz, 4H), 7.44 (s, 1H), 7.18 (d, J=7.2 Hz, 4H), 6.99 (d, J=7.3 Hz, 2H) confirms the expected structure.

The integration of the peak at 7.44 ppm in $^1$H NMR allows us to know the chlorosulfonation rate of the PEES (XVIII). The chlorosulfonation rate of the dioxoaryl motifs is 100%.

The XXVI polymer weight yield is 84% with respect to the PEES (XVIIII) used.

EXAMPLE 8

Chlorosulfonation of PES. Preparation of Polymer XXVII

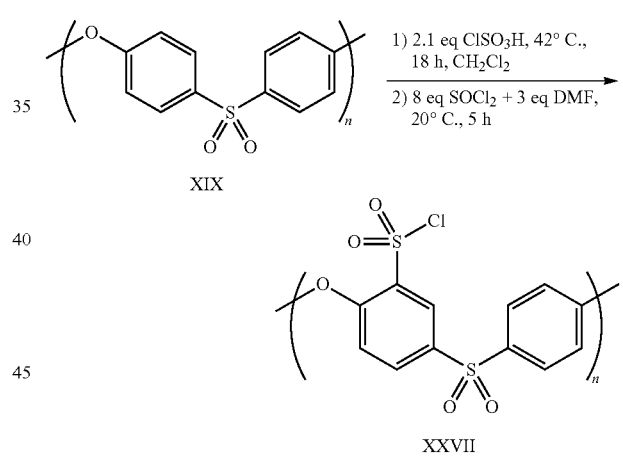

In a nitrogen atmosphere, in a cylindrical glass reactor, 0.5 g of PES (XIX) is directly weighed, then 80 mL of distilled dichloromethane are added so as to have a PES (XIX) molar concentration of 0.027 M; after 1 hour under agitation at 20° C., the PES (XIX) is solubilized. All of the solvents used during these syntheses were distilled, stored and collected in a nitrogen atmosphere.

The chlorosulfonic acid (0.527 g, 2.1 equivalents with respect to the number of polymer units of the PES (XIX)) is introduced by means of a syringe (0.30 mL), taking care to work under a nitrogen flow. The reaction mixture is agitated at 42° C. for 18 h. At the end of the reaction, the formation of a yellow viscous compound is observed. The supernatant is removed while taking care to work under a nitrogen flow.

Then, thionyl chloride (2.03 g, 8 equivalents with respect to the number of polymer units of the PES (XIX)) is introduced by means of a syringe (1.24 mL), taking care to work under a nitrogen flow. Then, N,N-dimethylformamide (0.47 g, 3 equivalents with respect to the number of polymer units of the PES (XIX)) is added by means of a syringe (0.50 mL) taking care to work under a nitrogen flow. The reaction mixture is again agitated at 20° C. for 5 h, then 20 mL of distilled THF are added. At the end of the reaction, a yellow solution is observed.

The yellow solution is precipitated in propan-2-ol (80 mL), and a white precipitate forms. The solid is filtered, then washed with 2 times 20 mL of propan-2-ol and 3 times 20 mL of acetonitrile, then dried for one night under vacuum ($1 \cdot 10^{-2}$ mbar).

The $^1$H NMR spectrum produced in DMSO-D6 ($^1$H NMR (200 MHz) δ 8.29 (s, 1H), 7.92 (s, 3H), 7.19 (s, 3H)) confirms the expected structure. The integration of the peak at 8.29 ppm in $^1$H NMR allows us to know the chlorosulfonation rate of the PES (XIX). The chlorosulfonation rate of the oxoaryl motifs is 100%.

The PESSO$_2$Cl (XXVII) polymer weight yield is 98% with respect to the PES (XIX) used.

EXAMPLE 9

Preparation of Polymer XL with R=NH-Ph-3-CF$_3$

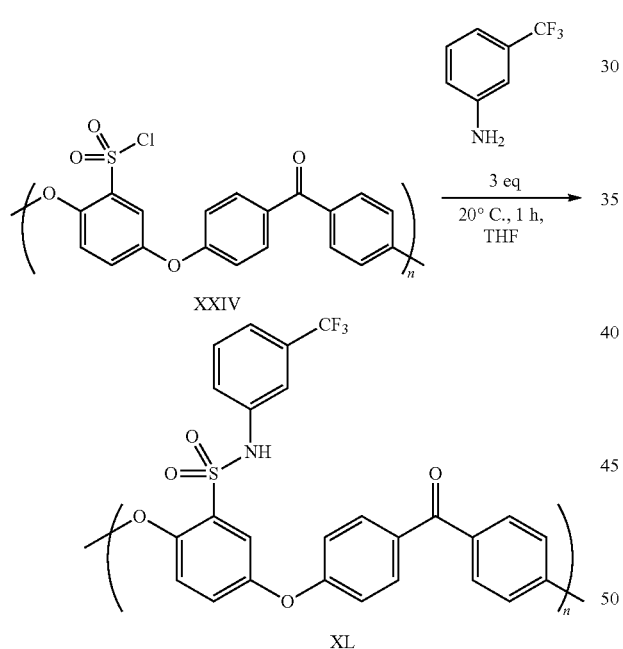

In a nitrogen atmosphere, in a cylindrical glass reactor, 0.500 g of polymer (XXIV) is directly weighed, then 20 mL of distilled tetrahydrofuran are added so as to have a PEEKSO$_2$Cl (XXIV) molar concentration of 0.065 M. All of the solvents used in these syntheses were distilled, stored and collected in a nitrogen atmosphere.

In a nitrogen atmosphere, in a cylindrical glass reactor, 0.624 g of 3-(trifluoromethyl)aniline (XXXIX) (3 equivalents with respect to the PEEKSO$_2$Cl (XV) are directly weight, then 20 mL of distilled tetrahydrofuran are added so as to have a molar concentration of 0.19 M. Then, the PEEKSO$_2$Cl (XVI) solution is introduced by means of a syringe, taking care to work under a nitrogen flow. The reaction is continued at 20° C. for 1 hour.

A limpid solution is obtained, which is evaporated with a rotary evaporator. After evaporation, a filmogenic solid is obtained, which is solubilized in 12 mL of tetrahydrofuran, then precipitated in 75 mL of acetonitrile. The precipitate is filtered, then washed with 3 times 10 mL of acetonitrile, then dried for one night under vacuum ($1 \cdot 10^{-2}$ mbar).

The $^1$H and $^{19}$F NMR spectra produced in DMSO-D6 ($^1$H NMR (200 MHz) δ 7.79 (s, 4H), 7.56-6.68 (m, 11H) and $^{19}$F NMR (188 MHz) δ −61.42 (s)) confirm the expected structure.

The XL weight yield with R=NH-Ph-3-CF$_3$ is 92% with respect to the polymer XXIV used.

EXAMPLE 10

Preparation of Polymer I with R=NH-Ph-3-CF$_3$ and M=Li

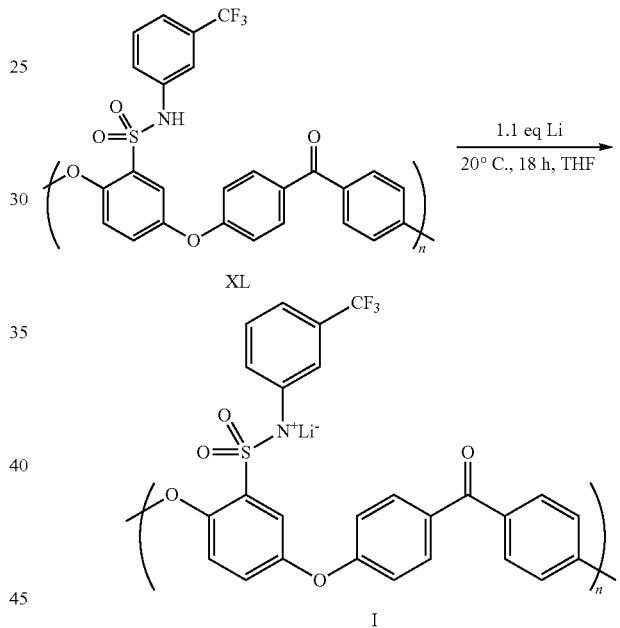

In a nitrogen atmosphere, in a cylindrical glass reactor, 0.200 g of

The XL weight yield with R=NH-Ph-3-CF$_3$ (XL), then 5 mL of distilled tetrahydrofuran are added. All of the solvents used during these syntheses have been distilled, stored and collected in a nitrogen atmosphere.

In a nitrogen atmosphere, 3 mg of lithium (1.1 equivalents with respect to PEEKSO$_2$NH-Ph-3-CF$_3$ (XL)) are added to the solution. The reaction is continued at 20° C. for 18 hours.

The solution obtained is filtered, then the filtrate is evaporated. The solid obtained is dried for one night under vacuum ($1 \cdot 10^{-2}$ mbar).

The $^1$H and $^{19}$F NMR spectra are produced in DMSO-D6 ($^1$H NMR (200 MHz) δ 8.01-7.69 (m, 4H), 7.68-7.47 (m, 2H), 7.46-6.67 (m, 9H) and $^{19}$F NMR (188 MHz) δ −61.04 (s)) confirm the expected structure.

The PEEKSO$_2$N"(Li$^+$)Ph-3-CF$_3$ (I) is 97% with respect to the PEEKSO$_2$NH-Ph-3-CF$_3$ (XL) used.

EXAMPLE 11

Preparation of Polymer I with R=NH-Ph-3-CF and M=Li

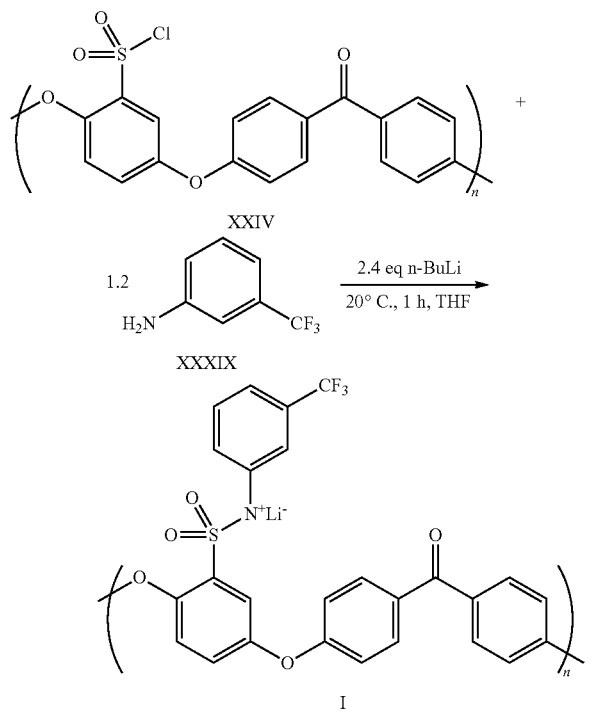

EXAMPLE 12

Preparation of Polymer III with R=NH-Ph-3-CF$_3$ and M=Li

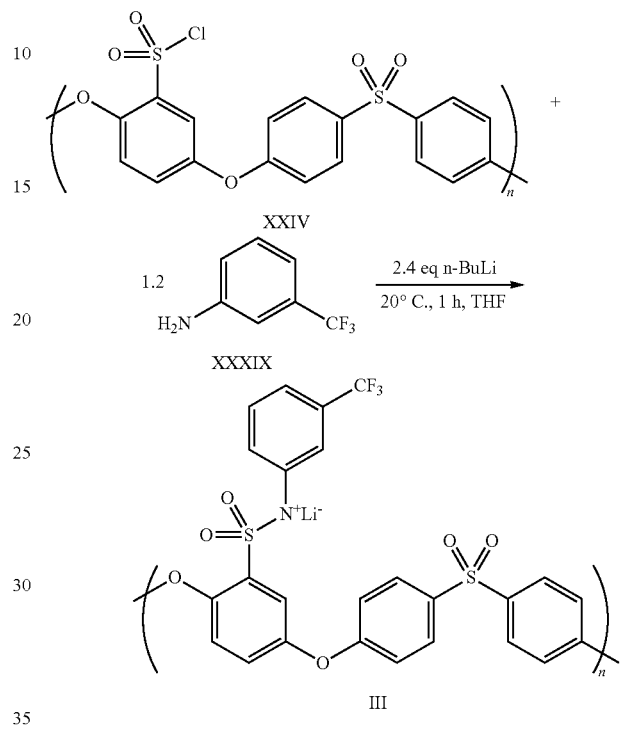

In a nitrogen atmosphere, in a cylindrical glass reactor, 0.200 g of PEEKSO$_2$Cl (XVIV) is directly weighed, then 10 mL of distilled tetrahydrofuran are added so as to have a PEEKSO$_2$Cl (XVIV) molar concentration of 0.052 M. All of the solvents used during these syntheses were distilled, stored and collected in a nitrogen atmosphere.

In a nitrogen atmosphere, in a cylindrical glass reactor, 0.100 g of 3-(trifluoromethyl)aniline (XXXIX) (1.2 equivalents with respect to the PEEKSO$_2$Cl (XVIV)) is directly weighed, then 10 mL of tetrahydrofuran are added. n-BuLi (0.50 ml, [C]=2.5 M in hexane) is introduced so as to have 2.4 equivalents with respect to the PEEKSO$_2$Cl (XVIV). This reagent is introduced by means of a syringe, taking care to work under a nitrogen flow. The reaction mixture is agitated at 20° C. for 15 minutes.

Then, the PEEKSO$_2$Cl (XVIV) solution is introduced by means of a syringe, taking care to work under a nitrogen flow. The reaction is continued at 20° C. for 1 hour. At the end of the reaction, a yellow precipitate is observed.

The precipitate is filtered and washed with 3 times 10 ml of acetonitrile. The solid obtained is dried for one night under vacuum (1·10$^{-2}$ mbar).

The NMR $^1$H and $^{19}$F spectra produced in DMSO-D6 ($^1$H NMR (200 MHz) δ 8.01-7.69 (m, 4H), 7.68-7.47 (m, 2H), 7.46-6.67 (m, 9H) and $^{19}$F NMR (188 MHz) δ −61.04 (s)) confirm the expected structure.

The PEEKSO$_2$N$^-$(Li$^+$)Ph-3-CF$_3$ (I) weight yield is 97% with respect to the PEEKSO$_2$Cl used.

In a nitrogen atmosphere, in a cylindrical glass reactor, 0.200 g of PEESSO$_2$Cl (XXVI) is directly weighed, then 10 mL of distilled tetrahydrofuran are added so as to have a PEESSO$_2$Cl (XXVI) molar concentration of 0.047 M. All of the solvents used during these syntheses were distilled, stored and collected in a nitrogen atmosphere.

In a nitrogen atmosphere, in a cylindrical glass reactor, 0.092 g of 3-(trifluoromethyl)aniline (XXXIX) (1.2 equivalents with respect to the PEESSO$_2$Cl (XXVI)) is directly weighed, then 10 mL of tetrahydrofuran are added. n-BuLi (0.50 ml, [C]=2.5 M in hexane) is introduced so as to have 2.4 equivalents with respect to the PEESSO$_2$Cl (XXVI). This reagent is introduced by means of a syringe, taking care to work under a nitrogen flow. The reaction mixture is agitated at 20° C. for 15 minutes.

Then, the PEESSO$_2$Cl (XXVI) solution is introduced by means of a syringe, taking care to work under a nitrogen flow. The reaction is continued at 20° C. for 1 hour. At the end of the reaction, a yellow precipitate is observed.

The precipitate is filtered and washed with 3 times 10 ml of acetonitrile. The solid obtained is dried for one night under vacuum (1·10$^{-2}$ mbar).

The NMR $^1$H and $^{19}$F spectra produced in DMSO-D6 ($^1$H NMR (200 MHz) δ 8.06-7.70 (m, 5H), 7.45 (s, 1H), 7.28-6.64 (m, 9H) and $^{19}$F NMR (188 MHz) δ −61.04 (s) confirm the expected structure.

The PEESSO$_2$N$^-$(Li$^+$)Ph-3-CF$_3$ (III) weight yield is 65% with respect to the PEESSO$_2$Cl (XXVI) used.

EXAMPLE 13

Preparation of Polymer IV with R=NH-Ph-3-CF$_3$ and M=Li

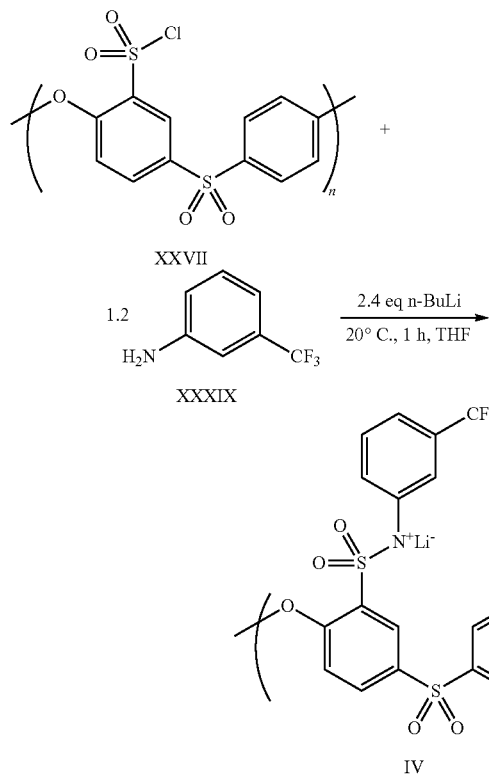

In a nitrogen atmosphere, in a cylindrical glass reactor, 0.200 g of PESSO$_2$Cl (XXVII) is directly weighed, then 10 mL of distilled tetrahydrofuran are added so as to have a PESSO$_2$Cl (XXVII) molar concentration of 0.076 M. All of the solvents used during these syntheses were distilled, stored and collected in a nitrogen atmosphere.

In a nitrogen atmosphere, in a cylindrical glass reactor, 0.146 g of 3-(trifluoromethyl)aniline (XXXIX) (1.2 equivalents with respect to the PESSO$_2$Cl (XXVII)) is directly weighed, then 10 mL of tetrahydrofuran are added. n-BuLi (0.73 ml, [C]=2.5 M in hexane) is introduced so as to have 2.4 equivalents with respect to the PESSO$_2$Cl (XXVII). This reagent is introduced by means of a syringe, taking care to work under a nitrogen flow. The reaction mixture is agitated at 20° C. for 15 minutes.

Then, the PESSO$_2$Cl (XXVII) solution is introduced by means of a syringe, taking care to work under a nitrogen flow. The reaction is continued at 20° C. for 1 hour. At the end of the reaction, a yellow precipitate is observed.

The precipitate is filtered and washed with 3 times 10 ml of acetonitrile. The solid obtained is dried for one night under vacuum (1·10$^{-2}$ mbar).

The NMR $^1$H and $^{19}$F spectra produced in DMSO-D6 ($^1$H NMR (200 MHz) δ 8.42-8.23 (m, 1H), 8.07-7.46 (m, 4H), 7.38-6.54 (m, 6H) and $^{19}$F NMR (188 MHz) δ −61.03 (s)) confirm the expected structure.

The PESSO$_2$N$^-$(Li$^+$)Ph-3-CF$_3$ (IV) weight yield is 83% with respect to the PESSO$_2$Cl (XXVII) used.

EXAMPLES 14

Preparation of Polymer Film

In a nitrogen atmosphere, in a cylindrical glass reactor, 100 mg of polymer I, III or IV are directly weighted, then 3 mL of distilled dimethylsulfoxide are added. All of the solvents used during these syntheses were distilled, stored and collected in a nitrogen atmosphere. After complete solubilization of the polymer, the solution is introduced into a petri dish with a diameter of 5 cm. The petri dish is placed on a heating plate at 50° C. After one night, the solvent is totally evaporated and a cylindrical film having a diameter of 5 cm, and a thickness of approximately 100 μm is obtained. This film is a transparent film having sufficient mechanical resistance to be extracted from the petri dish by means of a clamp and handled by an operator without tearing.

EXAMPLES 15

Conductivity Measurements

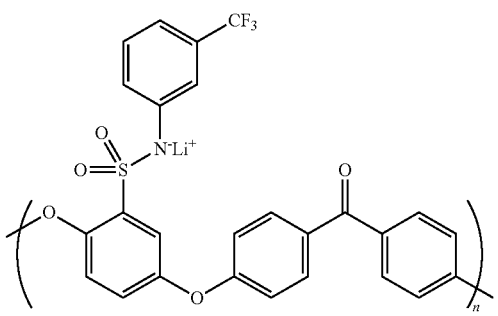

The ionic conductivity of the polymer prepared in example 10 was determined by impedance spectroscopy. The results obtained with the polymer described above are reported in table 1 and compared with the results obtained in the publication of D. Gigmes et al. in Nature Materials, 12, 452-457 (2013).

TABLE 1

| conductivity of the polymer described above at 20° C. with different solvents | | | |
|---|---|---|---|
| Solvent | DMC | PC | CH$_3$CN |
| Conductivity (S/cm) | 1.4 · 10$^{-6}$ | 4.15 · 10$^{-7}$ | 1.04 · 10$^{-6}$ |

It may be noted that, at room temperature, a conductivity on the order of 10$^{-6}$ S/cm is obtained. The conductivities published in patent FR 2979630 and the publication of D. Gigmes et al. in Nature Materials, 12, 452-457 (2013) are on the same order of amplitude, but at 45° C. It may therefore be concluded that at room temperature, very promising conductivities are obtained.

The invention claimed is:
1. A polymer selected from the group consisting of polymers of formulas I, II, III, IV, V, VI, VII, VIII, IX, X, XI, XII, XIII, XIV and XV

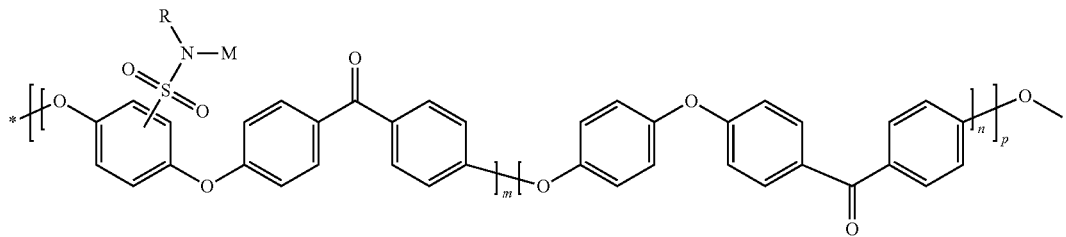
(I)
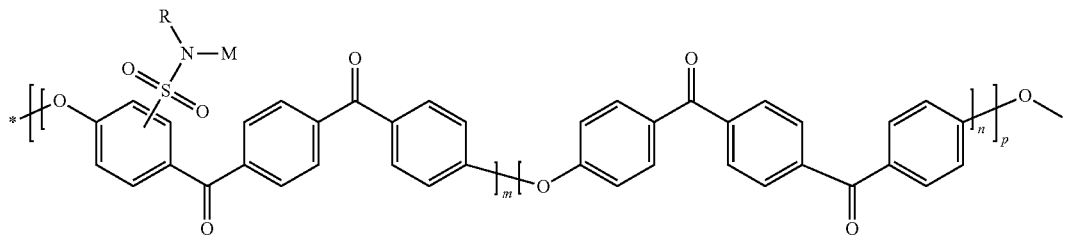
(II)
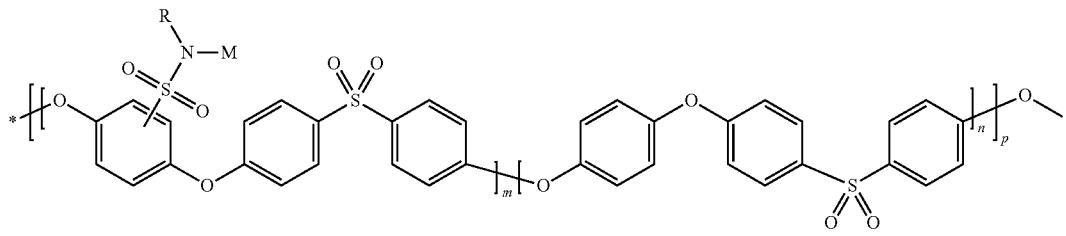
(III)
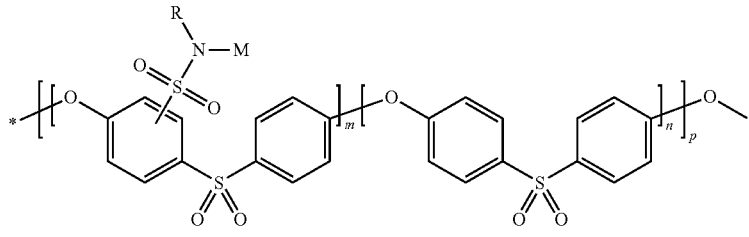
(IV)
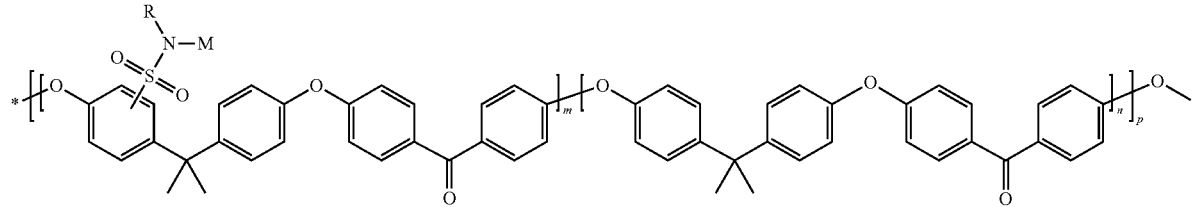
(V)
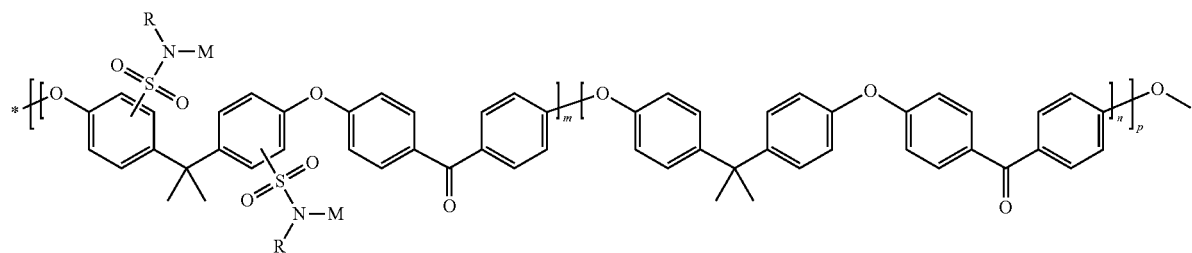
(VI)

-continued
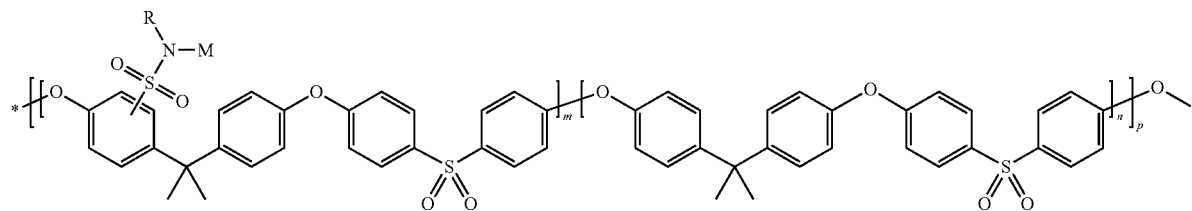
(VII)
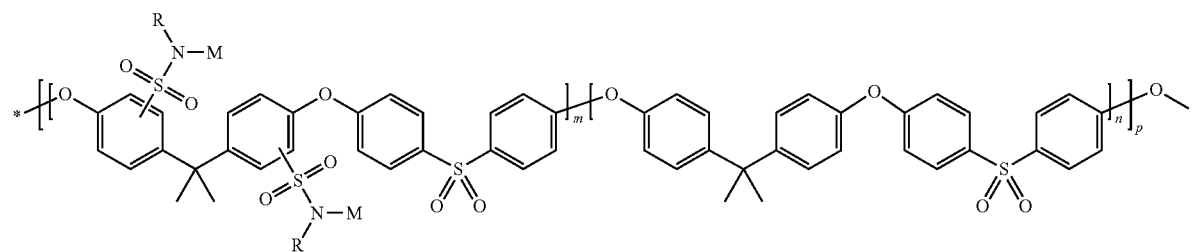
(VIII)
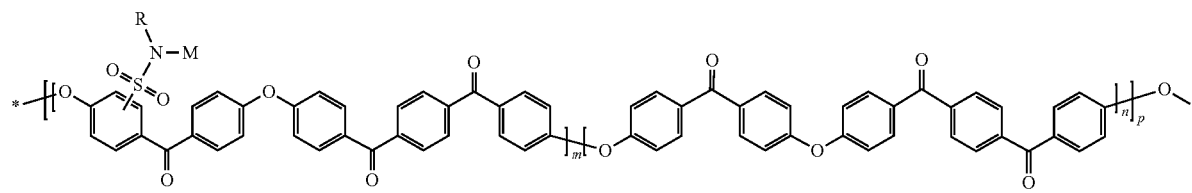
(IX)
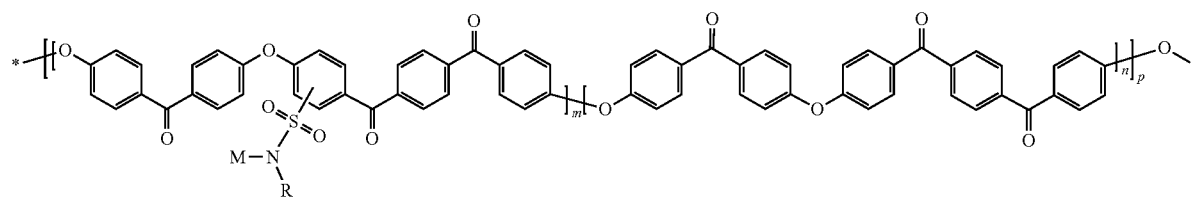
(X)
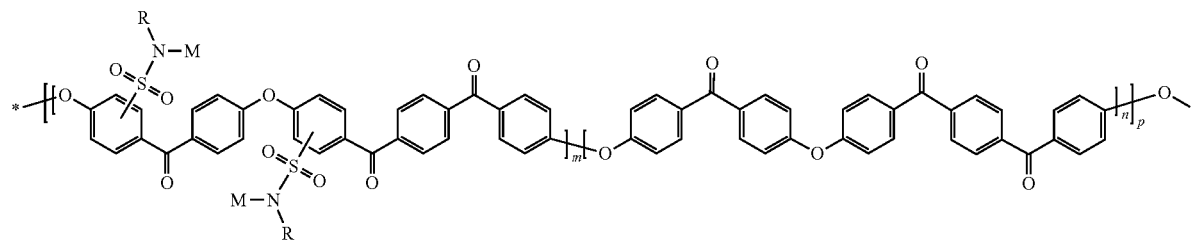
(XI)
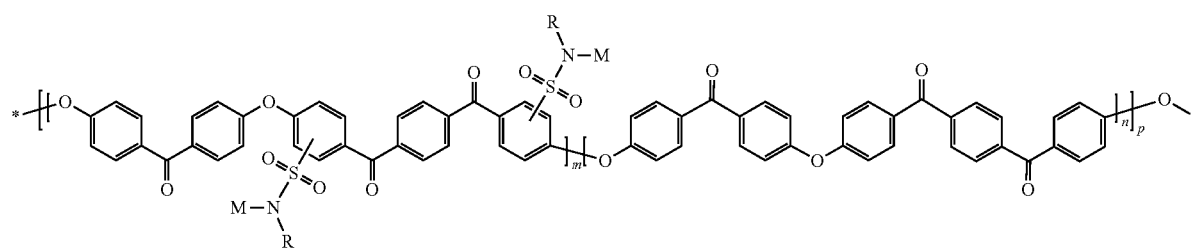
(XII)

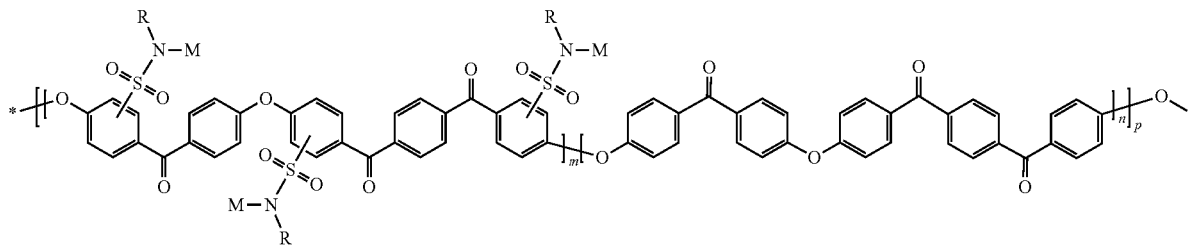

(XIII)

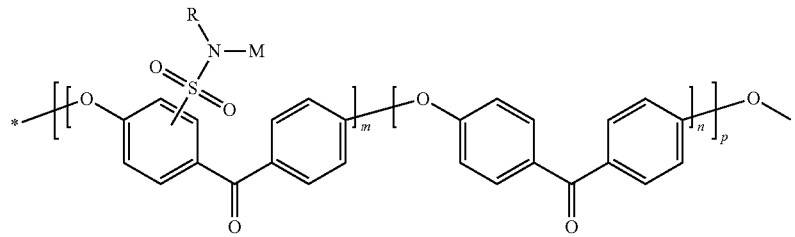

(XIV)

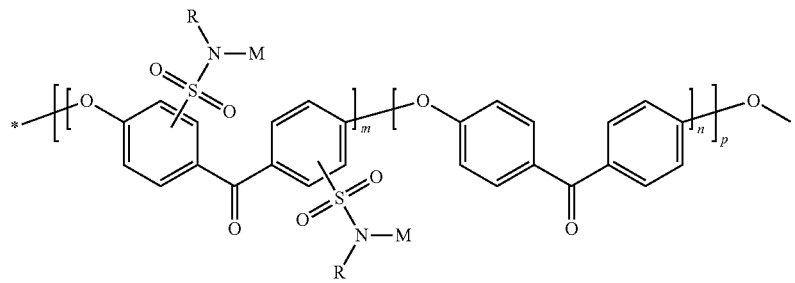

(XV)

wherein:
M represents a lithium or sodium atom
R represents
an alkyl group having 1 to 30 linear or branched carbon atoms optionally substituted by a cycloalkyl, aryl motif; a cycloalkyl group, optionally substituted by aromatic groups;
an aryl or polyaryl group optionally substituted by alkyl, cycloalkyl, polyfluoro- or perfluoroalkyl chains, nitrile functions, alkylsulfonyl functions, fluorine atoms;
m represents the percentage of polymer units having an oxoaryl or a dioxoaryl motif functionalized by a sulfonamide motif(s), this percentage varying between 50 and 100%,
n represents the percentage of polymer units having an oxoaryl or a dioxoaryl motif non-functionalized by one or more sulfonamide motif(s), this percentage varying between 0 and 50%,
p represents the number of polymer units of the polymer, p varying from 40 to 300.

2. The polymer according to claim 1, wherein:
M represents a lithium or sodium atom,
R represents:
an alkyl with 1 to 10 carbon atoms;
a 2,2-difluoroethyl, 2,2-difluro-2-(trifluoromethyl)ethyl group;
an aryl group of the phenyl, tolyl, naphthyl, trifluoromethylphenyl, bis (trifluoromethyl) phenyl, cyanophenyl, alkylsulfonylphenyl, aryl sulfonylphenyl, methoxyphenyl, butoxyphenyl, pentafluorophenyl, alkylsulfonylphenyl or fluorophenyl type;
m represents the percentage of polymer units having an oxoaryl or dioxoaryl motif functionalized by a sulfonamide motif, this percentage varying between 90 and 100%;
n represents the percentage of polymer units having no oxoaryl or dioxoaryl motif non-functionalized by a sulfonamide motif, this percentage varying between 0 and 10%;
p represents the number of polymer units of the polymer, p varying from 40 to 300.

3. The polymer according to claim 2, wherein R is selected from the group consisting of methyl, ethyl, propyl, butyl, pentyl, hexyl, cyclohexyl, and ethylhexyl groups.

4. The polymer according to claim 1, wherein:
M represents a lithium or sodium atom,
R is a methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl) methyl, ((1R)-7, 7-dimethyl-2-oxobicyclo[2.2.1]heptan-1-yl) methyl, (1S)-(7,7-dimethyl-2-oxobicyclo[2.2 1]heptan-1-yl) methyl, cyclohexylmethyl, phenyl, tolyl, naphthyl, 4-trifluoromethylphenyl, 3,5-bis(trifluoromethyl)phenyl, 4-cyanophenyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, 4-ethylphenyl, phenoxyethyl, methoxyethyl, ethoxyethyl, 4-methoxyphenoxyethyl group;

m represents the percentage of polymer units having a dioxoaryl motif functionalized by a sulfonamide, this percentage varying between 90 and 100%;

n represents the percentage of polymer units having a dioxoaryl motif non-functionalized by a sulfonamide, this percentage varying between 0 and 10%;

p represents the number of polymer units of the polymer, p varying from 60 to 200.

5. A method for synthesis of a polymer according to claim 1, comprising:
in a first step, performing chlorosulfonation of a polymer selected from the group consisting of polymers of formulas XVI, XVII, XVIII, XIX, XX, XXI, XXII, and XXIII by a mixture of chlorosulfonic acid, thionyl chloride and a formamide (XVI)
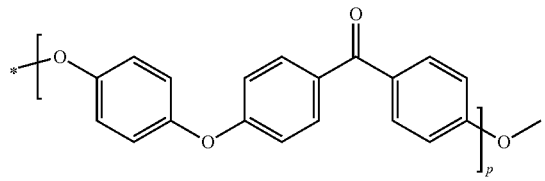

(XVII)
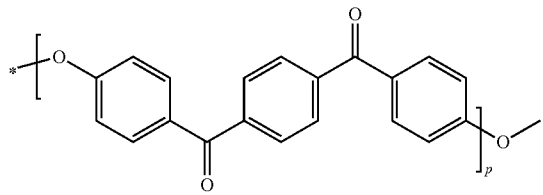

(XVIII)
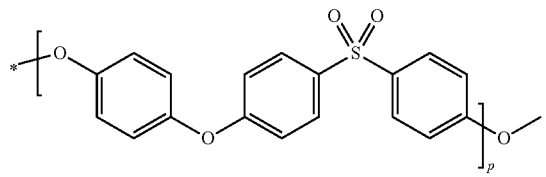

(XIX)
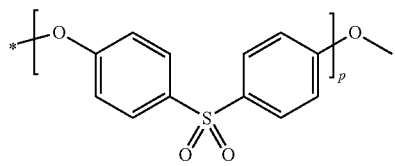

(XX)
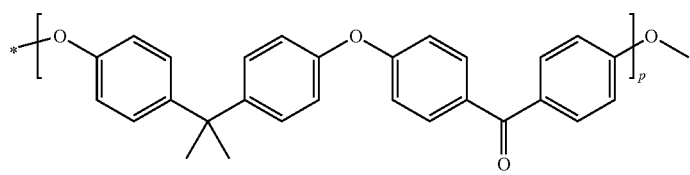

(XXI)
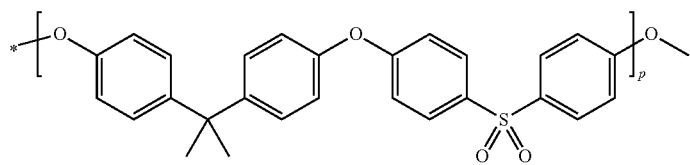

(XXII)
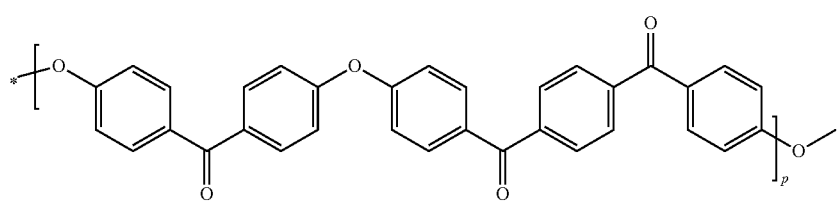

(XXIII)
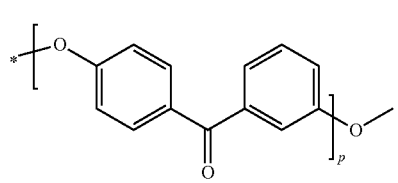

wherein:
p represents the number of polymer units of the polymer, p varying from 40 to 300, in order to obtain a polymer selected from the group consisting of the polymers of formulas XXIV, XXV, XXVI, XVII, XXVIII, XIX, XXX, XXXI, XXXII, XXXIII, XXXIV, XXXV, XXXVI, XXXVII and XXXVIII

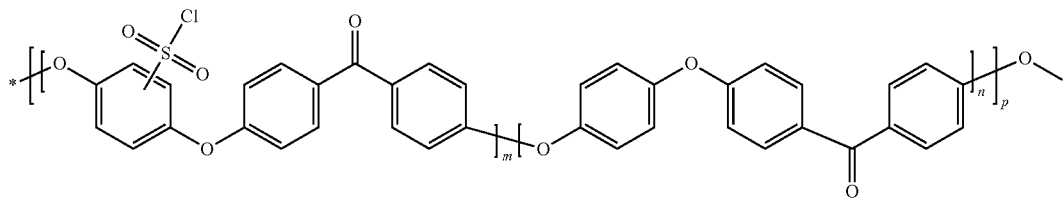
(XXIV)
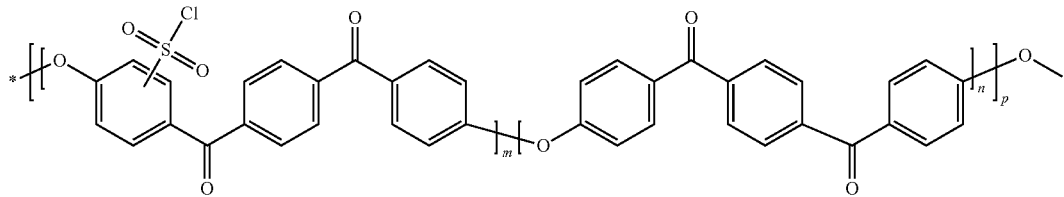
(XXV)
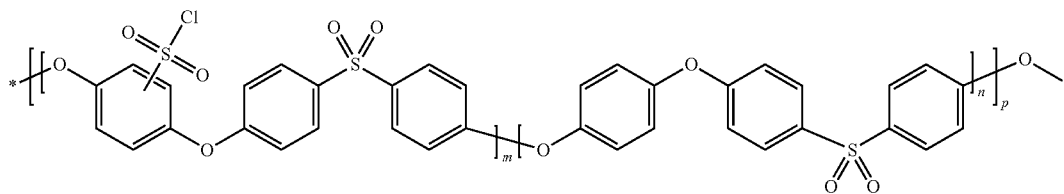
(XXVI)
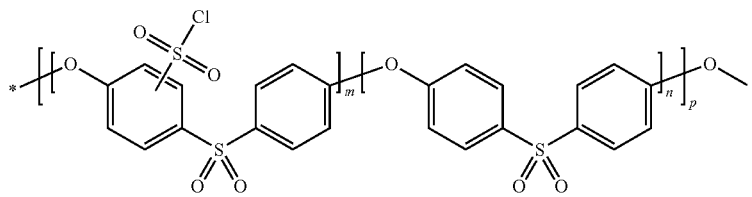
(XXVII)
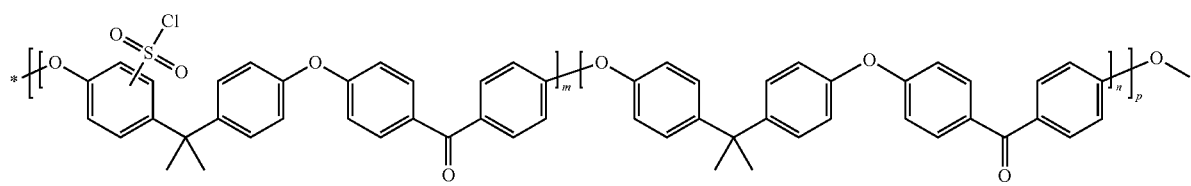
(XXVIII)
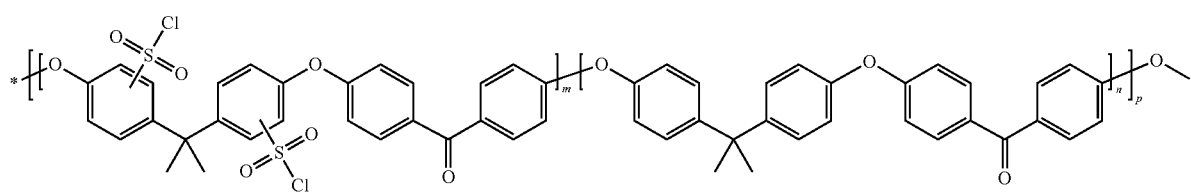
(XXIX)
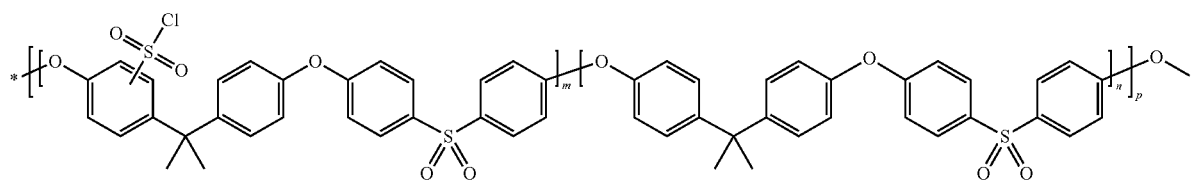
(XXX)

(XXXI)
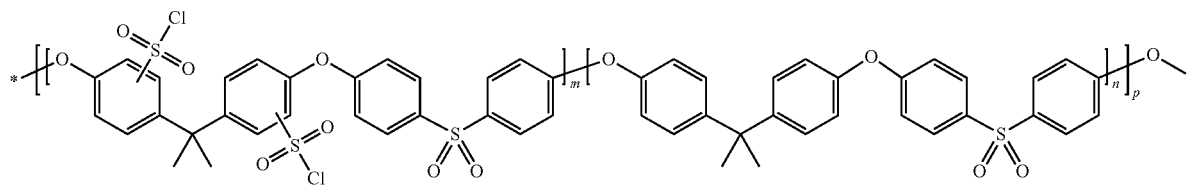
(XXXII)
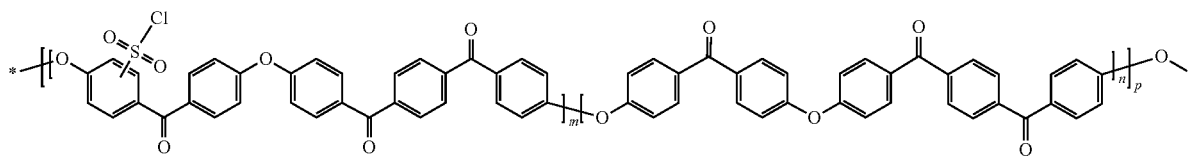
(XXXIII)
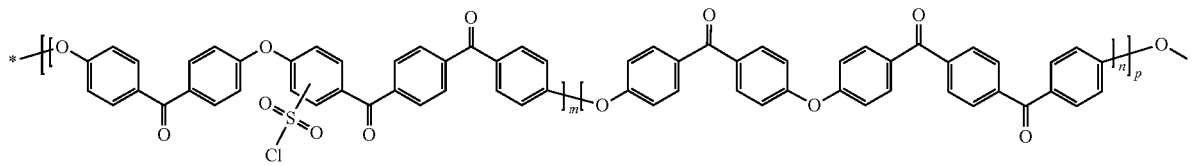
(XXXIV)
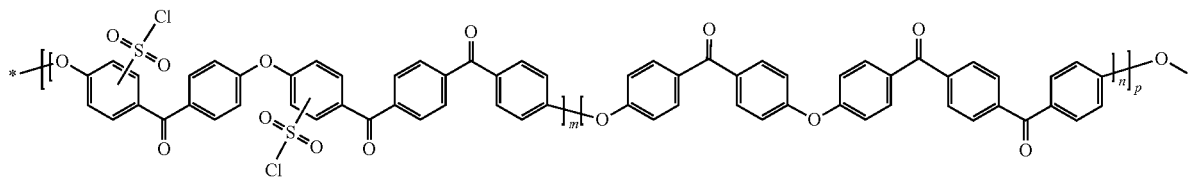
(XXXV)
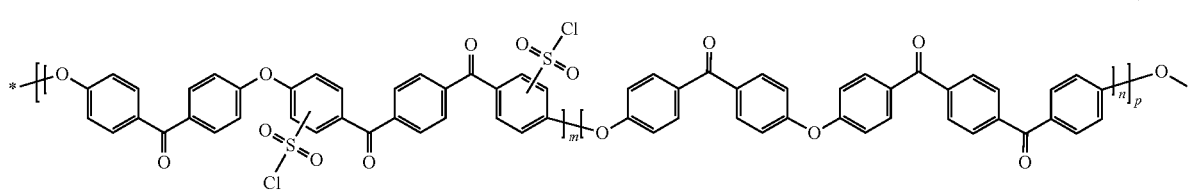
(XXXVI)
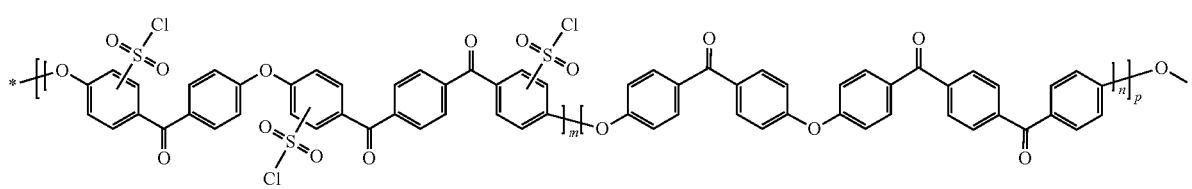
(XXXVII)
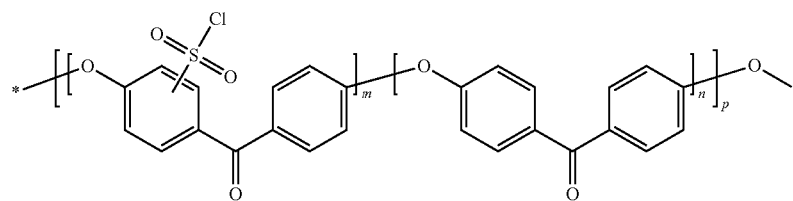

(XXXVIII)

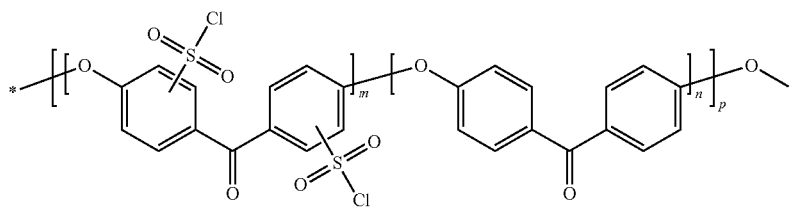

wherein:
- m represents the percentage of polymer units having an oxoaryl or dioxoaryl motif functionalized by a chlorosulfonated group, this percentage varying between 50 and 100%,
- n represents the percentage of polymer units having a dioxoaryl motif non-functionalized by a chlorosulfonated group, this percentage varying between 0 and 50%,
- p represents the number of polymer units of the polymer, p varying from 40 to 300, in a second step, producing a reaction on the polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII with an amine of formula XXXIX in a solvent medium $$R-NH_2 \quad (XXXIX)$$

wherein
R represents a group or different groups chosen from:
- an alkyl or cycloalkyl group having 1 to 30 linear or branched carbon atoms, optionally substituted by a cycloalkyl, aryl, perfluoroalkyl, polyfluoroalkyl, mono or polyethoxyl motif;
- an aryl or polyaryl group optionally substituted by alkyl, cycloalkyl, polyfluoro- or perfluoroalkyl, motifs, by nitrile functions, by alkyl- or alkylsulfonyl functions, by fluorine atoms;

for obtaining a polymer selected from the group consisting of polymers of formula XL, XLI, XLII, XLIII, XLIV, XLV, XLVI, XLVII, XLVIII, XLIX, L, LI, LII, LIII and LIV (XL)

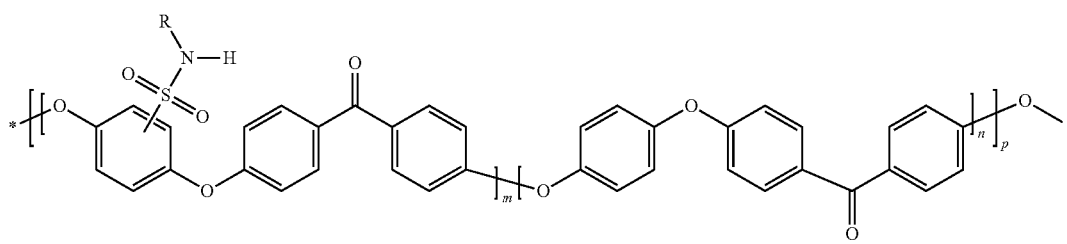

(XLI)

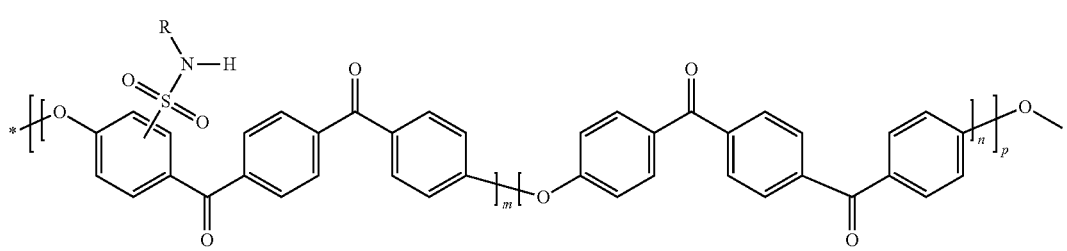

(XLII)

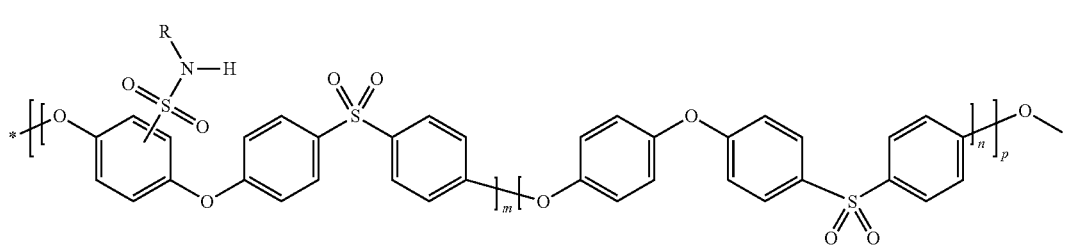

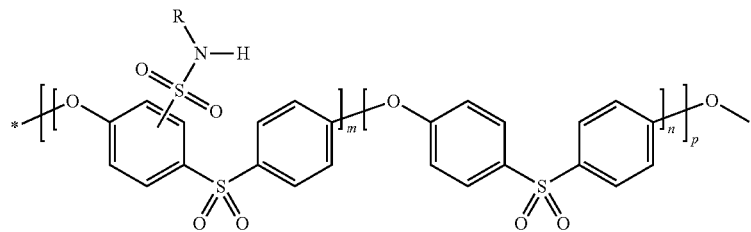
(XLIII)
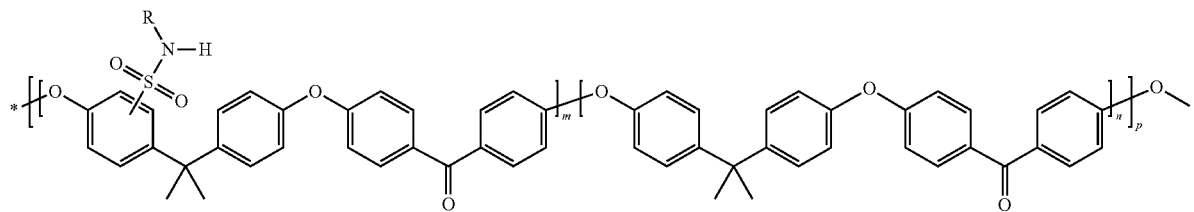
(XLIV)
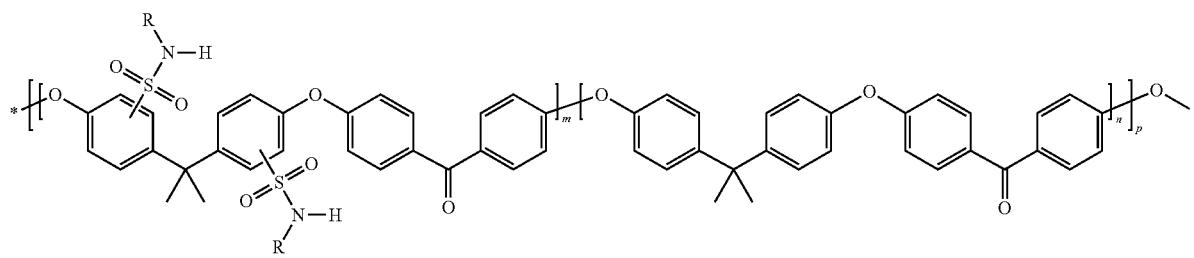
(XLV)
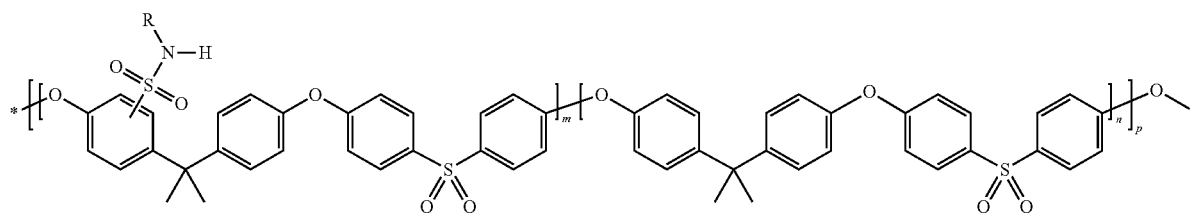
(XLVI)
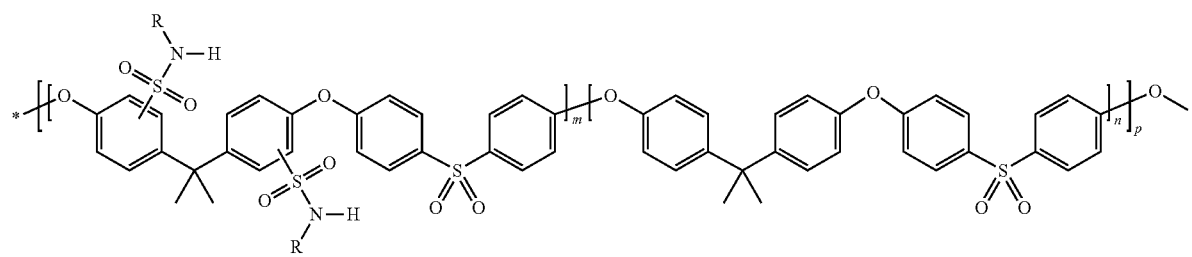
(XLVII)
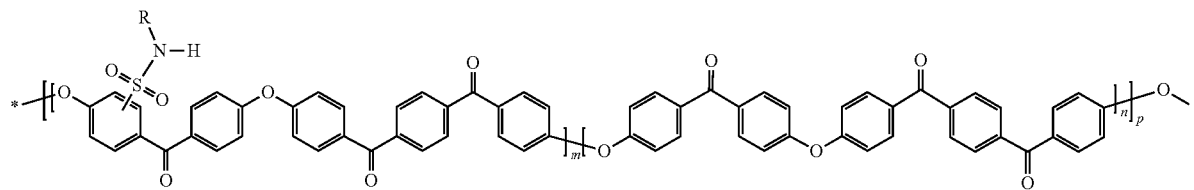
(XLVIII)

-continued
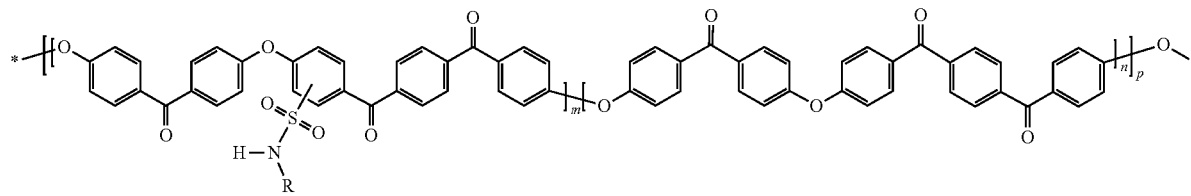
(XLIX)
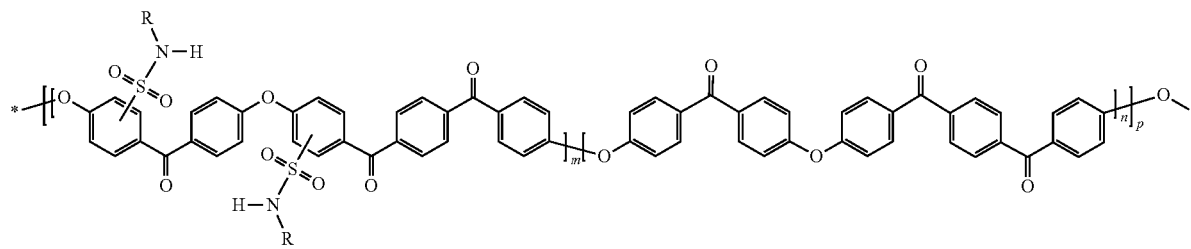
(IL)
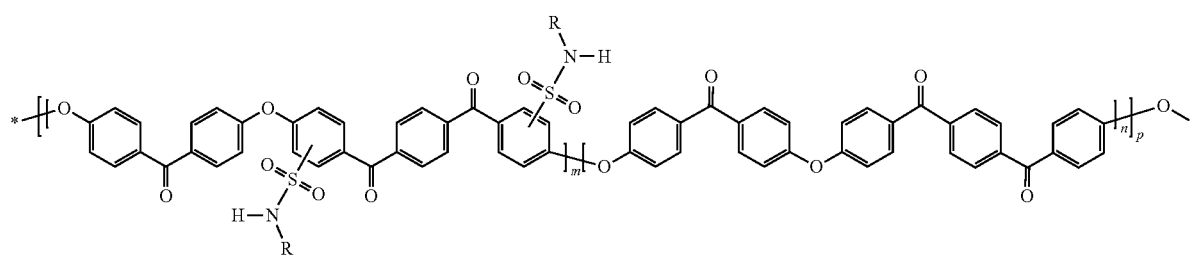
(LI)
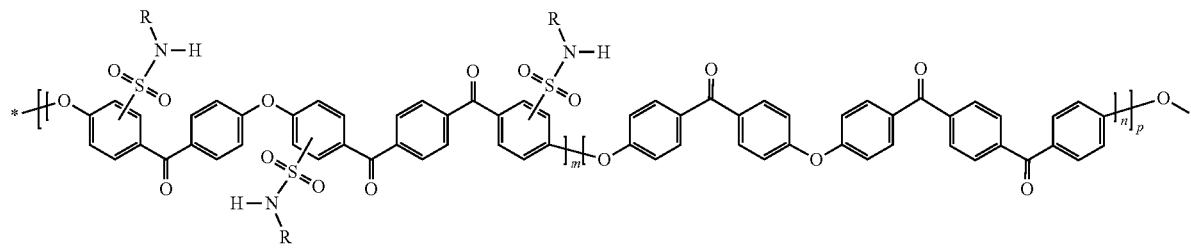
(LII)
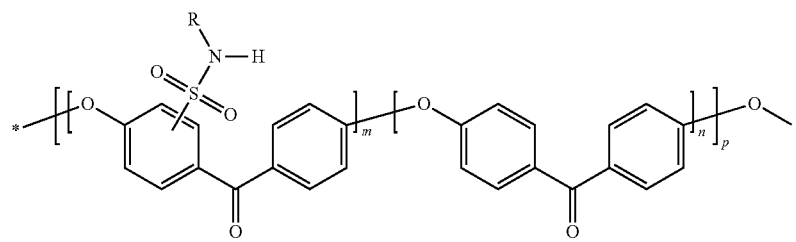
(LIII)
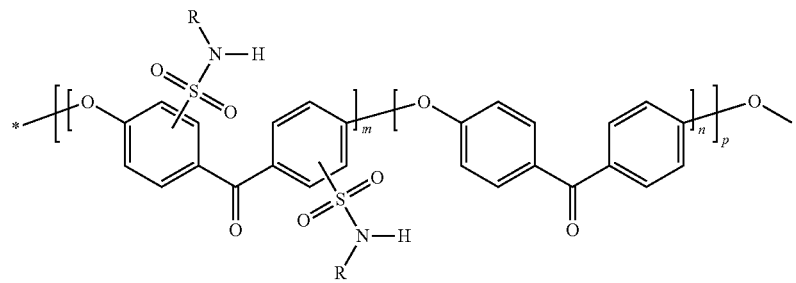
(LIV)

wherein
  m represents the percentage of polymer units having a functionalized oxoaryl or dioxoaryl motif having a sulfonamide function, this percentage varying between 50 and 100%,
  n represents the percentage of polymer units having an oxoaryl or dioxoaryl motif non-functionalized by a sulfonamide function, this percentage varying between 0 and 50%,
  p represents the number of polymer units of the polymer, p varying from 40 to 300, in a third step, producing a reaction on the polymer selected from the group consisting of polymers of formula XL, XLI, XLII, XLIII, XLIV, XLV, XLVI, XLVII, XLVIII, XLIX, L, LI, LII, LIII and LIV with a lithium or sodium base at a temperature of between 0 and 80° C. in a solvent medium.

6. The method according to claim 5, wherein the R group of the XXXIX amine is a methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl) methyl, ((1R)-7,7-dimethyl-2-oxobicyclo[2.2.1]heptan-1-yl) methyl, (1S)-(7,7-dimethyl-2-oxobicyclo[2.2.1]heptan-1-yl) methyl, cyclohexylmethyl, phenyl, tolyl, naphthyl, 4-trifluoromethylphenyl, 3,5-bis(trifluoromethyl)phenyl, 4-cyanophenyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, 4-ethylphenyl, phenoxyethyl, methoxyethyl, ethoxyethyl, 4-methoxyphenoxyethyl group.

7. the method according to claim 5, wherein the chlorosulfonation is performed at a temperature of between 0 and 80° C. by a mixture of 1 to 10 equivalents of chlorosulfonic acid, 1 to 30 equivalents of thionyl chloride in the presence of 1 to 10 equivalents of an amide.

8. The method according to claim 5, wherein the base is chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidure, tert-butyllithium, methyllithium, phenyllithium, phenylsodium, benzyllithium, benzylsodium, lithium dimsylate, sodium dimsylate.

9. The method according to claim 5, wherein the chlorosulfonation is performed in the presence of N,N-dimethylformamide.

10. The method according to claim 5, wherein the chlorosulfonation is performed in a solvent or a mixture of solvents.

11. The method according to claim 5, wherein the amination reaction of the chlorosulfonated polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII, in order to form the sulfonamide polymer selected from the group consisting of polymers of formulas XL, XLI, XLII, XLIII, XLIV, XLV, XLVI, XLVII, XLVIII, XLIX, L, LI, LII, LIII and LIV is performed in a solvent medium in the presence of the XXXIX amine in a solvent.

12. The method according to claim 5, wherein the amination reaction of the polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII with the amine of formula XXXIX is performed at a temperature of between −20° C. and 60° C.

13. The method according to claim 5, wherein m represents the percentage of polymer units having an oxoaryl or dioxoaryl motif functionalized by a chlorosulfonated group, this percentage varying between 90 and 100%.

14. A method of preparing a film, comprising using filmogenic polymers according to claim 1, wherein the film has a thickness of between 10μm and 200μm.

15. A method for preparing a film adapted for serving as electrolyte for batteries, comprising, in a medium in the absence of traces of water and moisture, solubilizing the polymer according to claim 1 in an anhydrous solvent to obtain a polymer solution, depositing the polymer solution on a solid support, and then evaporating the solvent by heating at a temperature comprised between 20 and 80° C., inert gas sweeping or by applying reduced pressure.

16. The method according to claim 15 wherein the solvent is DMSO.

17. An electrolyte for batteries, comprising films made from polymers according to claim 1, wherein the electrolyte has a conductivity on the order of $10^{-6}$ S/cm in a solvent medium and without solvent.

18. An electrolyte for batteries, comprising films made from polymers according to claim 1, wherein the electrolytes are used in a temperature range of between 20 and 100° C.

19. A polymer selected from the group consisting of polymers of formulas XL, XLI, XLII, XLIII, XLIV, XLV, XLVI, XLVII, XLVIII, XLIX, L, LI, LII, LIII and LIV

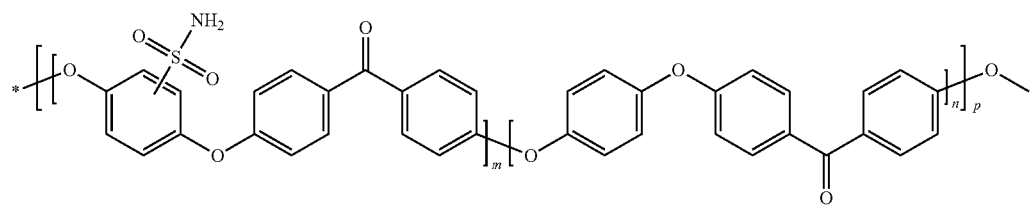

(XL)

(XLI)
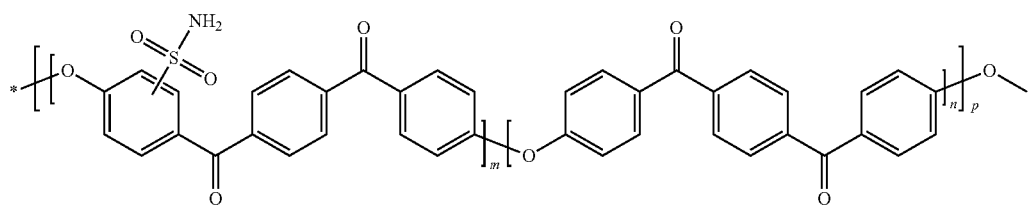
(XLII)
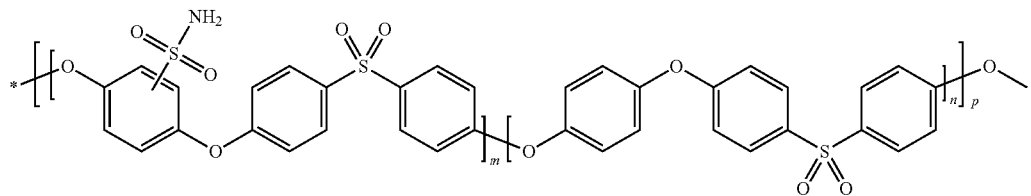
(XLIII)
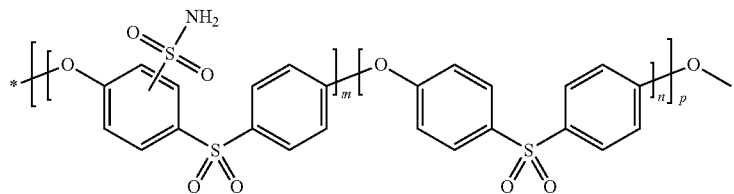
(XLIV)
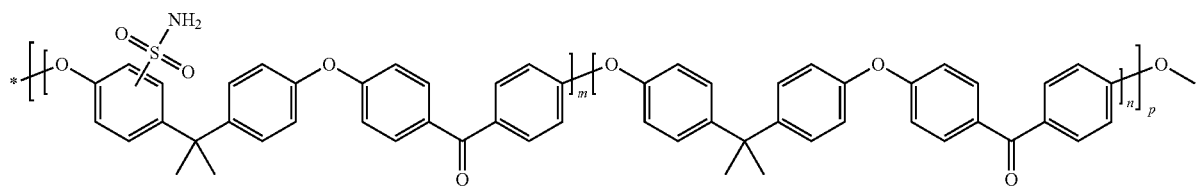
(XLV)
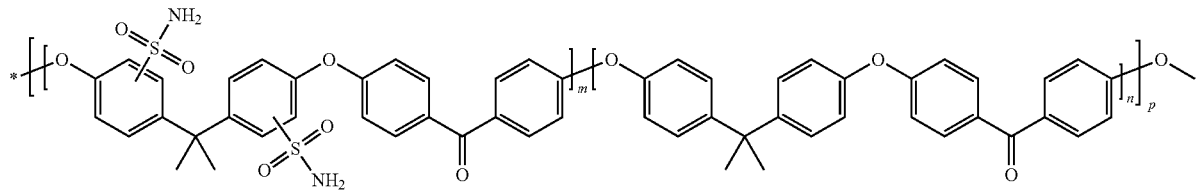
(XLVI)
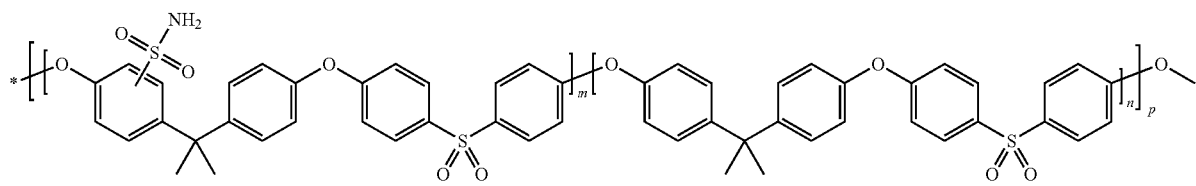
(XLVII)
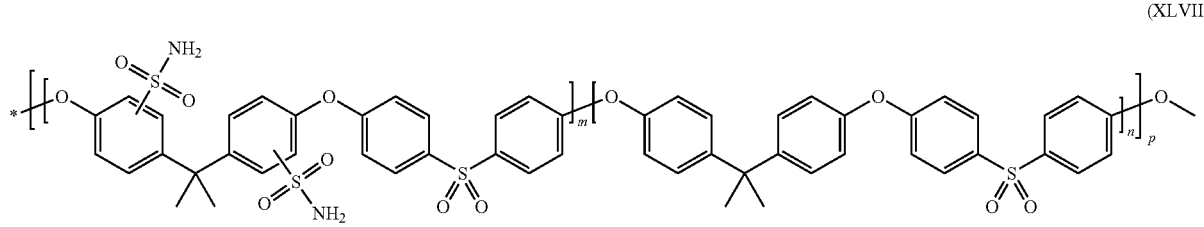

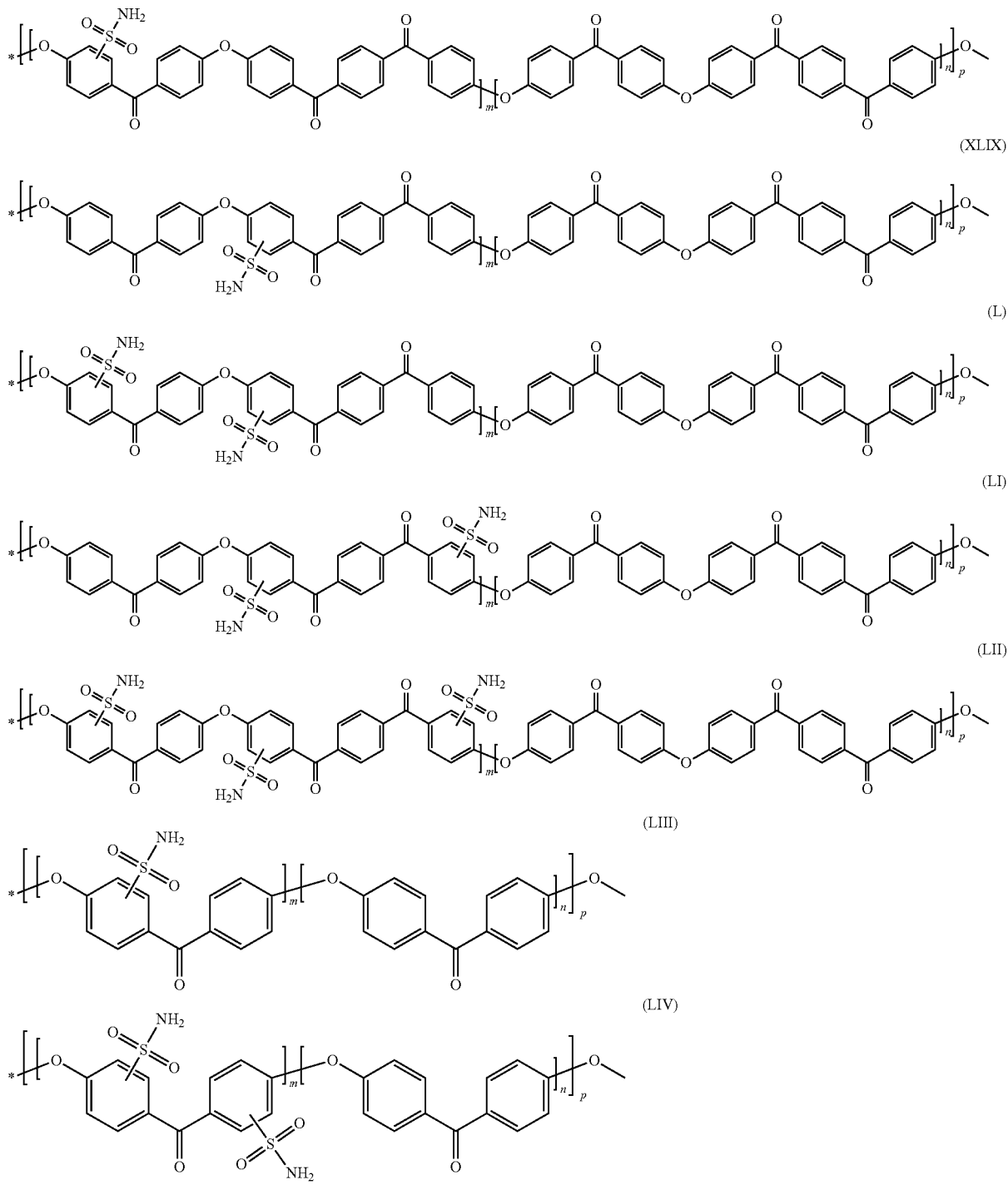

wherein:
  m represents the percentage of polymer units having an oxoaryl or dioxoaryl motif functionalized by a sulfonamide motif(s), this percentage varying between 50 and 100%,
  n represents the percentage of polymer units having an oxoaryl or dioxoaryl motif non-functionalized by one or more sulfonamide motif(s), this percentage varying between 0 and 50%,
  p represents the number of polymer units of the polymer, p varying from 40 to 300.

20. A synthesis method comprising preparing a polymer selected from the group consisting of polymers of formulas I, II, III, IV, V, VI, VII, VIII, IX, X, XI, XII, XIII, XIV and XV

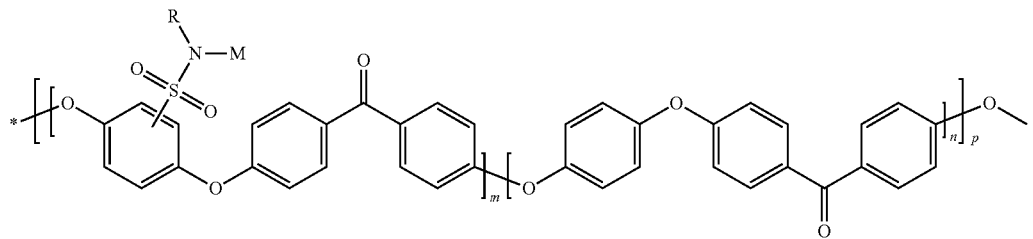
(I)
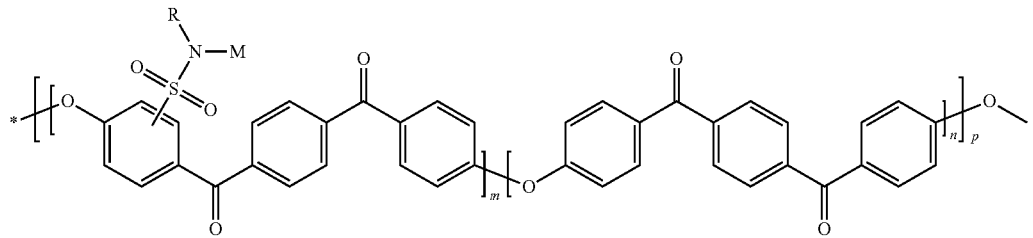
(II)
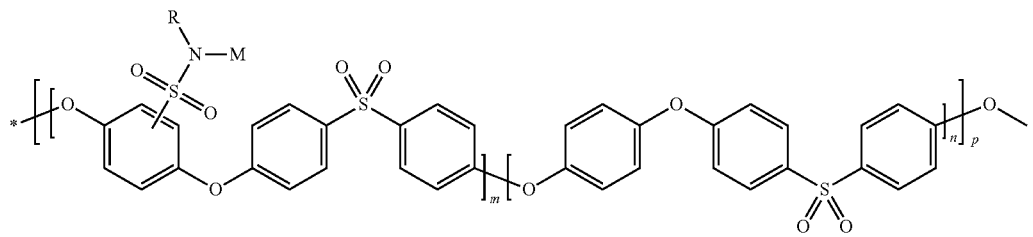
(III)
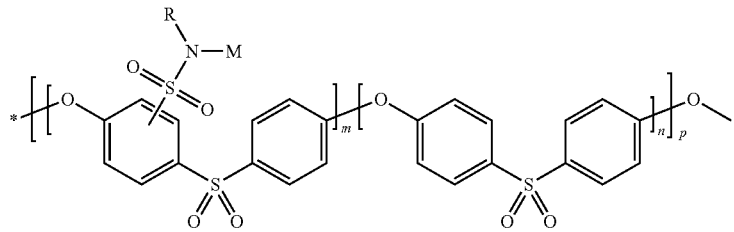
(IV)
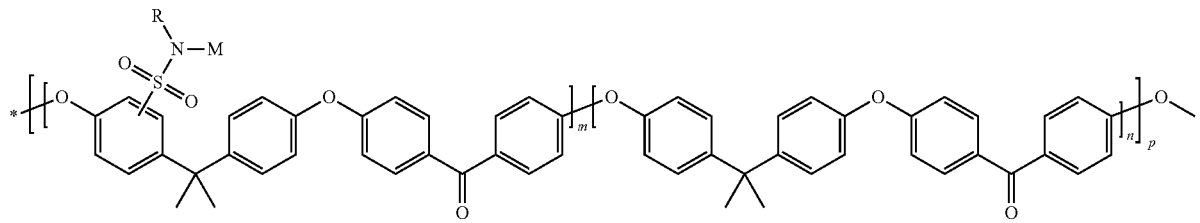
(V)
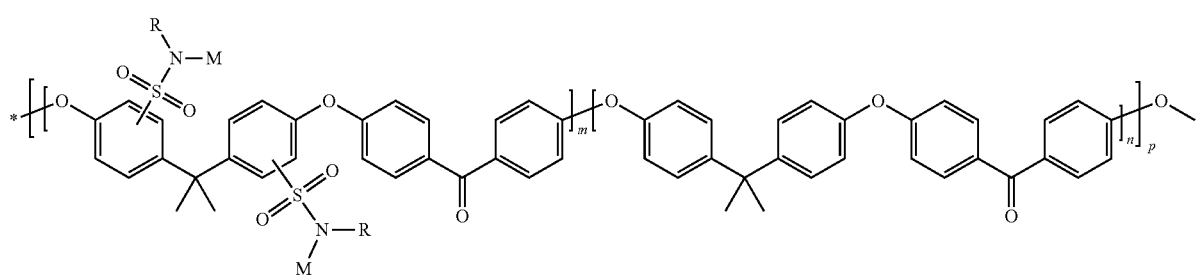
(VI)

-continued
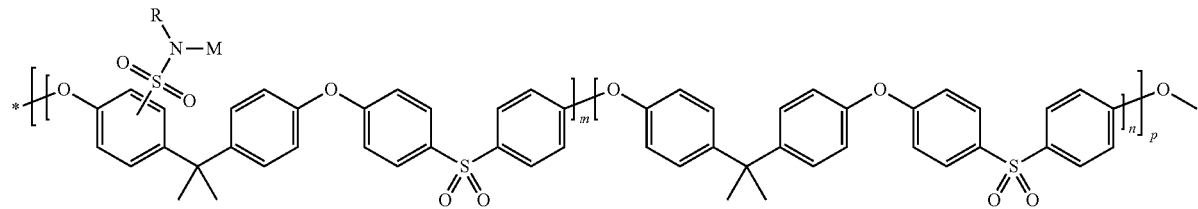
(VII)
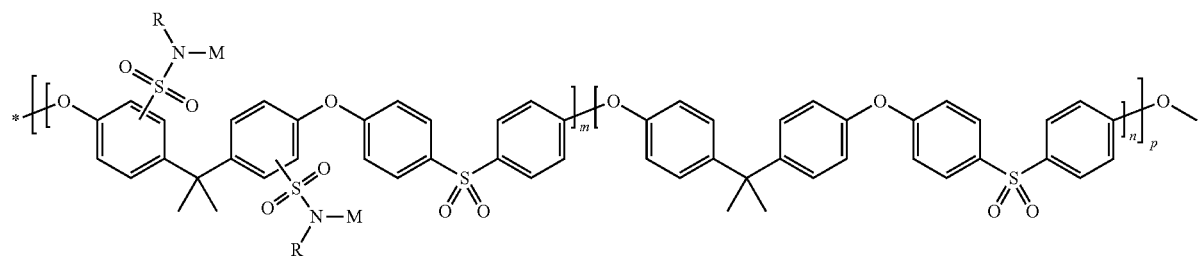
(VIII)
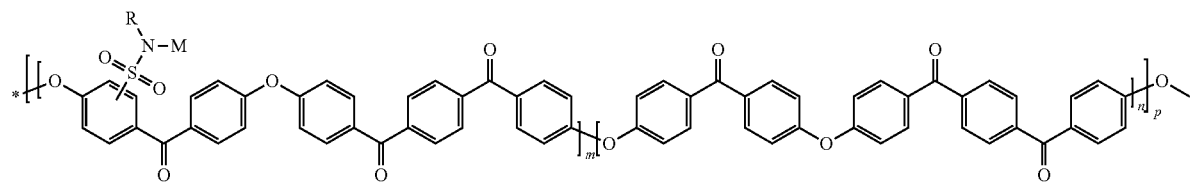
(IX)
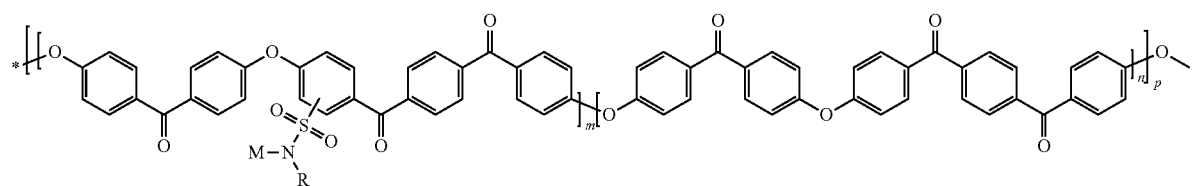
(X)
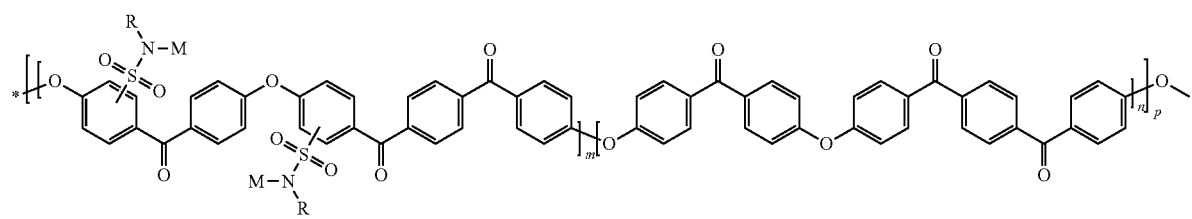
(XI)
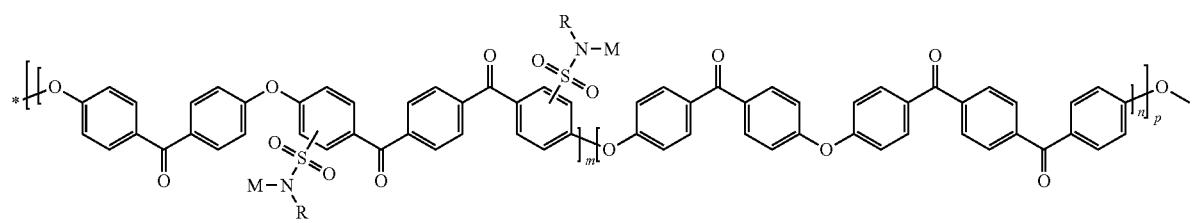
(XII)

(XIII)

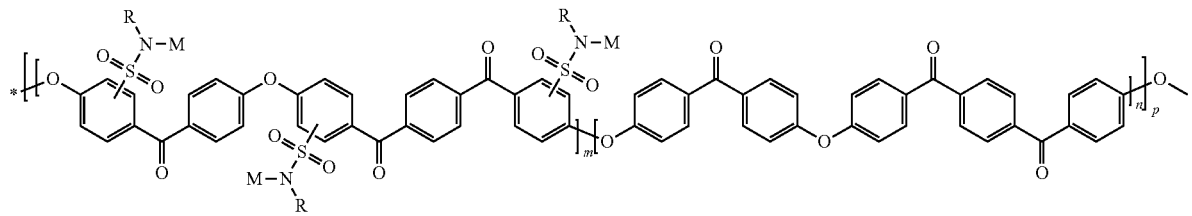

(XIV)

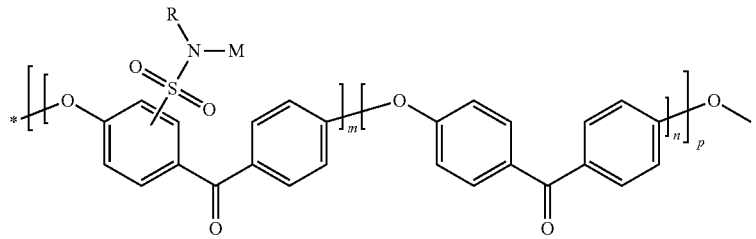

(XV)

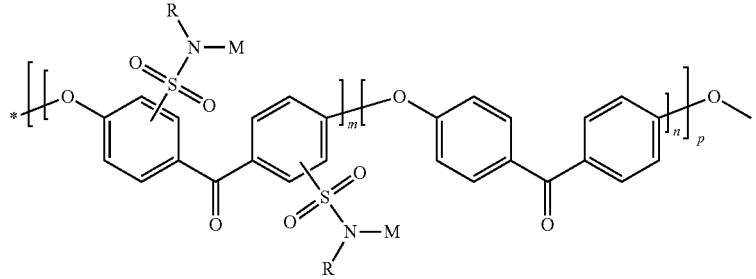

wherein:
M represents a lithium or sodium atom
R represents
an alkyl group having 1 to 30 linear or branched carbon atoms optionally substituted by a cycloalkyl, aryl motif; a cycloalkyl group, optionally substituted by aromatic groups:
an aryl or polyaryl group optionally substituted by alkyl, cycloalkyl, polvfluoro- or perfluoroalkyl chains, nitrile functions, alkylsulfonyl functions, fluorine atoms;
m represents the percentage of polymer units having an oxoaryl or a dioxoaryl motif functionalized by a sulfonamide motif(s), this percentage varying between 50 and 100%,
n represents the percentage of polymer units having an oxoaryl or a dioxoaryl motif non-functionalized by one or more sulfonamide motif(s), this percentage varying between 0 and 50%,
p represents the number of polymer units of the polymer, p varying from 40 to 300,
by using a polymer selected from the group consisting of polymers of formulas XL, XLI, XLII, XLIII, XLIV, XLV, XLVI, XLVII, XLVIII, XLIX, L, LI, LII, LIII and LIV as synthesis intermediate (XL)

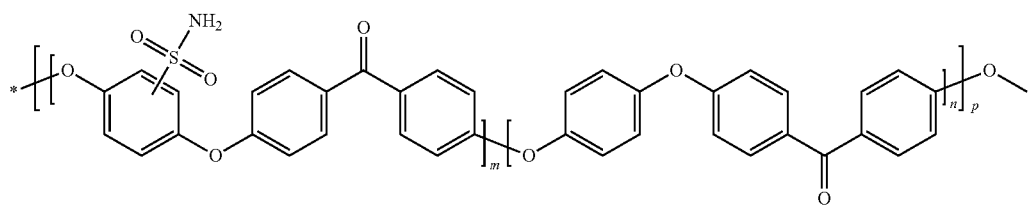

(XLI)

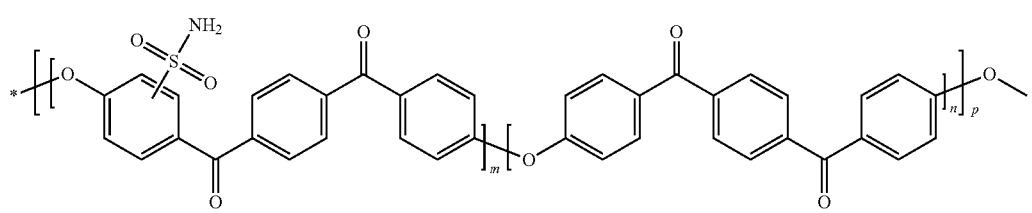

-continued
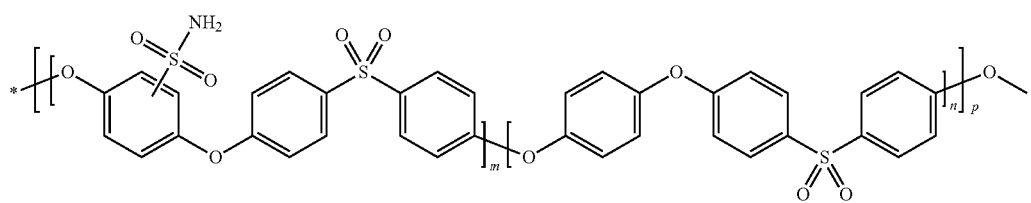
(XLII)
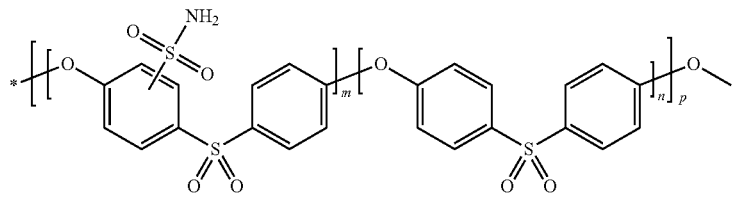
(XLIII)
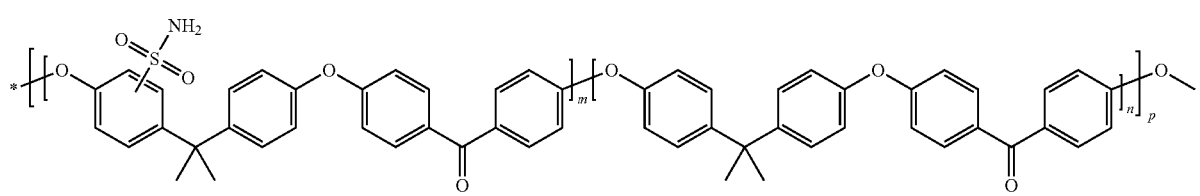
(XLIV)
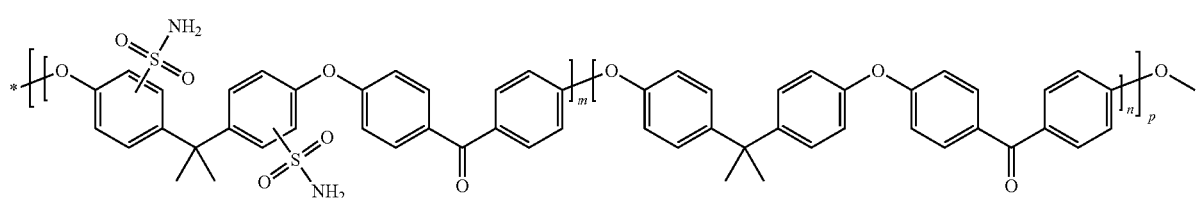
(XLV)
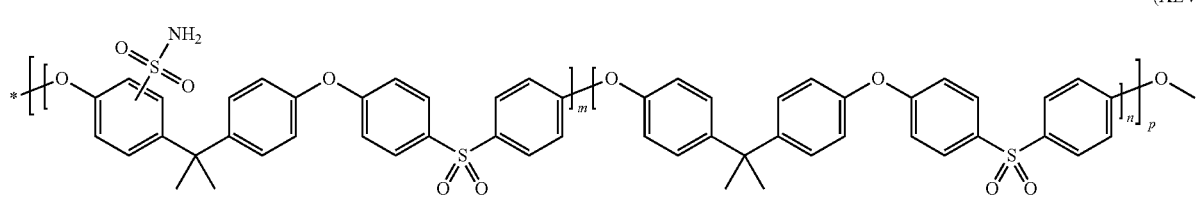
(XLVI)
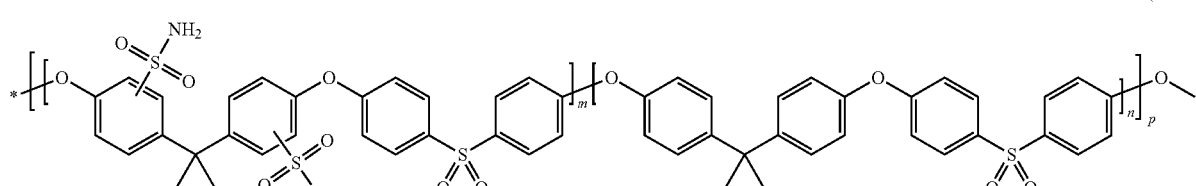
(XLVII)
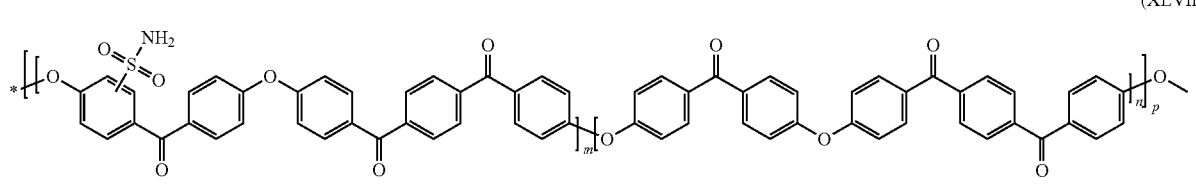
(XLVIII)
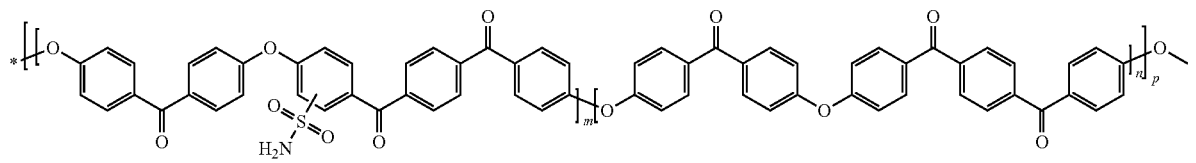
(XLIX)

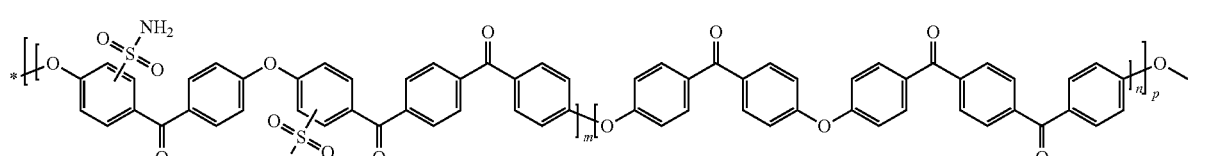
(L)

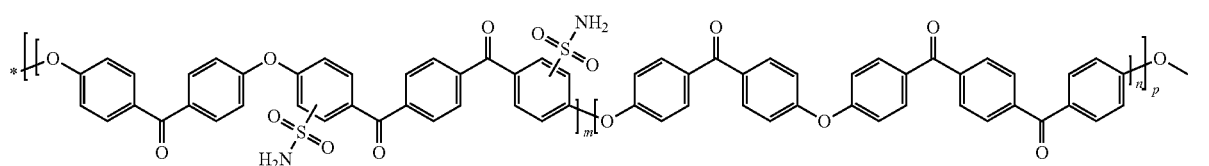
(LI)

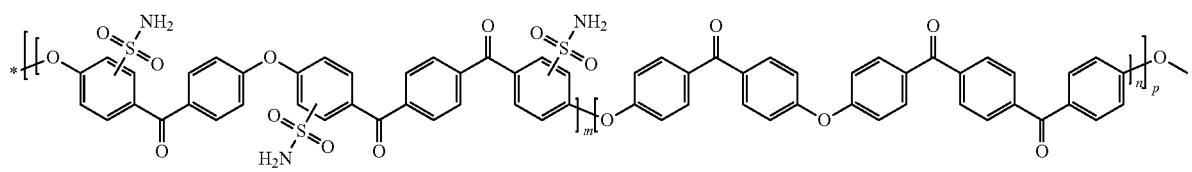
(LII)

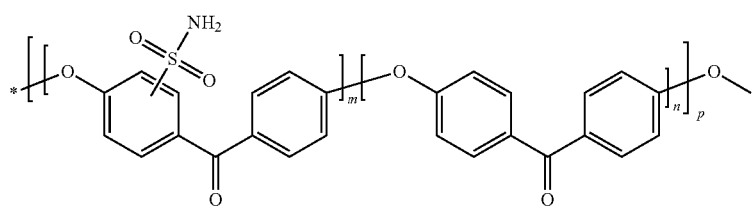
(LIII)

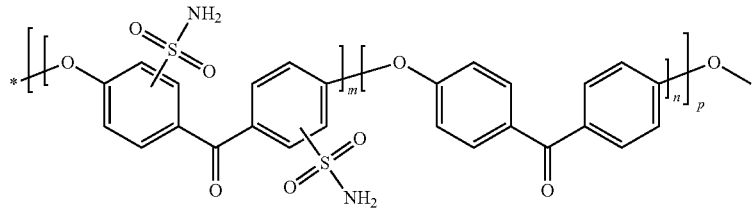
(LIV)

wherein:
- m represents the percentage of polymer units having an oxoaryl or dioxoaryl motif functionalized by a sulfonamide motif(s) this percentage varying between 50 and 100%,
- n represents the percentage of polymer units having an oxoaryl or dioxoaryl motif non-functionalized by one or more sulfonamide motif(s), this percentage varying between 0 and 50%,
- p represents the number of polymer units of the polymer, p varying from 40 to 300.

\* \* \* \* \*